US012743933B2

(12) United States Patent
Kobayashi et al.

(10) Patent No.: US 12,743,933 B2
(45) Date of Patent: Sep. 22, 2026

(54) CASH HANDLING SYSTEM AND CASH HANDLING METHOD

(71) Applicant: GLORY LTD., Himeji (JP)

(72) Inventors: Kiyoaki Kobayashi, Himeji (JP); Shinsuke Nishiguchi, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 19/240,033

(22) Filed: Jun. 17, 2025

(65) Prior Publication Data

US 2025/0316147 A1 Oct. 9, 2025

Related U.S. Application Data

(63) Continuation of application No. PCT/JP2023/042915, filed on Nov. 30, 2023.

(30) Foreign Application Priority Data

Dec. 19, 2022 (JP) ................................ 2022-202260

(51) Int. Cl.
*G07F 19/00* (2006.01)
*G07D 11/60* (2019.01)

(52) U.S. Cl.
CPC ........... *G07F 19/202* (2013.01); *G07D 11/60* (2019.01); *G07F 19/203* (2013.01)

(58) Field of Classification Search
None
See application file for complete search history.

(56) References Cited

U.S. PATENT DOCUMENTS

| | | | |
|---|---|---|---|
| 8,510,222 | B2 | 8/2013 | Bachrany et al. |
| 2019/0026970 | A1 | 1/2019 | Doi et al. |

FOREIGN PATENT DOCUMENTS

| | | | |
|---|---|---|---|
| JP | H01-095363 | A | 4/1989 |
| JP | H10-247214 | A | 9/1998 |
| JP | H10-334316 | A | 12/1998 |
| JP | 2004-005347 | A | 1/2004 |
| JP | 2017-126275 | A | 7/2017 |
| JP | 2018-151809 | A | 9/2018 |
| JP | 2019-066923 | A | 4/2019 |

OTHER PUBLICATIONS

International Search Report and Written Opinion mailed on Jan. 9, 2024, received for PCT Application PCT/JP2023/042915, filed on Nov. 30, 2023, 11 pages including English Translation.

*Primary Examiner* — Kristy A Haupt
(74) *Attorney, Agent, or Firm* — XSENSUS LLP

(57) ABSTRACT

A cash handling system includes: a cash handling apparatus; a support server storing therein store identification information of a plurality of stores, inventory amount information of cash in each store, and ID information of each of clerks of the stores; an acquisition unit to acquire ID information from a user of the cash handling apparatus; and a control circuitry configured to, when the user authenticated based on the acquired ID information is a clerk, acquire inventory amount information of the store stored in the support server in association with the ID information, and display an input screen, which includes the acquired inventory amount information and is displayed on a display of the cash handling apparatus, for instructing cash handling to be performed in the cash handling apparatus. The cash handling apparatus performs the cash handling, based on an instruction from the user performed on the input screen.

15 Claims, 19 Drawing Sheets

FIG.9

| STORE ID | APPARATUS ID | INVENTORY AMOUNT INFORMATION | REPLENISHMENT INFORMATION | COLLECTION INFORMATION | ... |
|---|---|---|---|---|---|
| S001 | M001 | ... | | | |
| | M002 | | | | |
| | ⋮ | | | | |
| S002 | M011 | ... | | | |
| | M012 | | | | |
| | ⋮ | | | | |
| ⋮ | | | | | |

FIG.10

| IN-STORE CASH | | | |
|---|---|---|---|
| | BANKNOTE | COIN | TOTAL |
| FRONT MACHINE | 1··· | ··· | ··· |
| BACK MACHINE | 1··· | ··· | ··· |
| TOTAL | 2··· | ··· | ··· |

| FRONT MACHINE | | | |
|---|---|---|---|
| APPARATUS ID | INVENTORY AMOUNT | REPLENISHMENT REQUIRED | COLLECTION REQUIRED |
| F001 | 1··· | ··· | ··· |
| ⋮ | | | |
| TOTAL | 4··· | ··· | ··· |

| BACK MACHINE | | | |
|---|---|---|---|
| APPARATUS ID | INVENTORY AMOUNT | REPLENISHMENT REQUIRED | COLLECTION REQUIRED |
| R005 | 1··· | ··· | ··· |
| ⋮ | | | |
| TOTAL | 5··· | ··· | ··· |

| RATIO OF DEPOSITED AMOUNT TO DISPENSED AMOUNT | | | | | |
|---|---|---|---|---|---|
| DENOMI-NATION | DEPOSIT | DEPOSIT PERCENTAGE | GRAPH | DISPENSE | DISPENSE PERCENTAGE |
| 5.00EUR | 7560 | 87.5% | | 1080 | 12.5% |
| 10.00EUR | ··· | | | | |
| ⋮ | | | | | |
| TOTAL | ··· | | | | |

FIG.17

| STORE ID | APPARATUS ID | OTHER STORE ID | ACCOUNT HANDLING CONDITION | BREAKDOWN OF OTHER STORE | ··· |
|---|---|---|---|---|---|
| S001 | M001 | S002 | TIME ··· | 1··· | ··· |
| | | S003 | AMOUNT ··· | -1··· | |
| | | ⋮ | | | |

CASH HANDLING SYSTEM AND CASH HANDLING METHOD

CROSS-REFERENCE RELATED TO APPLICATIONS

The present application is a bypass continuation of International application PCT/JP2023/042915, filed Nov. 30, 2023, which claims priority to JP2022-202260, filed Dec. 19, 2022. The entire contents of these applications are incorporated herein by reference.

TECHNICAL FIELD

The present disclosure relates to a cash handling system and a cash handling method for performing cash handling related to store operations and cash handling related to bank accounts.

BACKGROUND ART

Conventionally, ATMs (automated teller machines) have been used for withdrawal and depositing of cash using bank accounts. For example, a store clerk uses an ATM to deposit cash obtained through business operations of the store, i.e., sales proceeds, into the bank account of the store. A technology for using one ATM as ATMs of a plurality of banks is known in the art. By using such an ATM, clerks of a plurality of stores having accounts at different banks can deposit cash into their bank accounts by using a single ATM.

SUMMARY

A cash handling system according to one aspect of the present disclosure includes: a cash handling apparatus; a support server configured to store therein store identification information of a plurality of stores, inventory amount information of cash in each store, and ID information of each of clerks of the stores; an acquisition unit configured to acquire ID information from a user of the cash handling apparatus; and a control circuitry. In a case where the user authenticated based on the ID information acquired by the acquisition unit is a clerk, the control circuitry is configured to acquire inventory amount information of the store stored in the support server in association with the ID information, and display, on a display of the cash handling apparatus, an input screen which includes the acquired inventory amount information and is used for instructing cash handling to be performed by the cash handling apparatus. The cash handling apparatus performs the cash handling, based on an instruction from the user performed on the input screen.

BRIEF DESCRIPTION OF THE DRAWINGS

FIG. 9 shows an example of store information managed by a store support server.

FIG. 10 shows an example of store information displayed when the clerk uses the cash handling apparatus.

FIG. 17 shows an example of information on account handling internally managed by a store support server.

DESCRIPTION OF EMBODIMENTS

In the conventional system, when depositing the sales proceeds from a store into an ATM, a clerk of the store only needs to deposit the cash obtained in the store into the ATM. However, when preparing cash to be used as change in the store, i.e., change fund, it takes time and labor for the clerk. The change fund is composed of a plurality of denominations of cash and therefore, it is difficult for the clerk to obtain the change fund by using the ATM that does not accept designation of denominations, and the quantity for each denomination of cash and simply dispenses a designated amount of cash. At a bank teller counter, the clerk can withdraw cash for change from a bank account of the store by designating a plurality of denominations, and the quantity for each denomination of cash. However, the clerk has to go to the bank teller counter during the business hours of the bank and complete the procedures for obtaining the change fund, which takes time and labor for the clerk.

The present disclosure has been made in view of the problem, as well as other problems, of the conventional art, and the present disclosure addresses these issues, as disclosed herein, with a cash handling system and a cash handling method that performs cash handling related to store operations.

Figure 1:
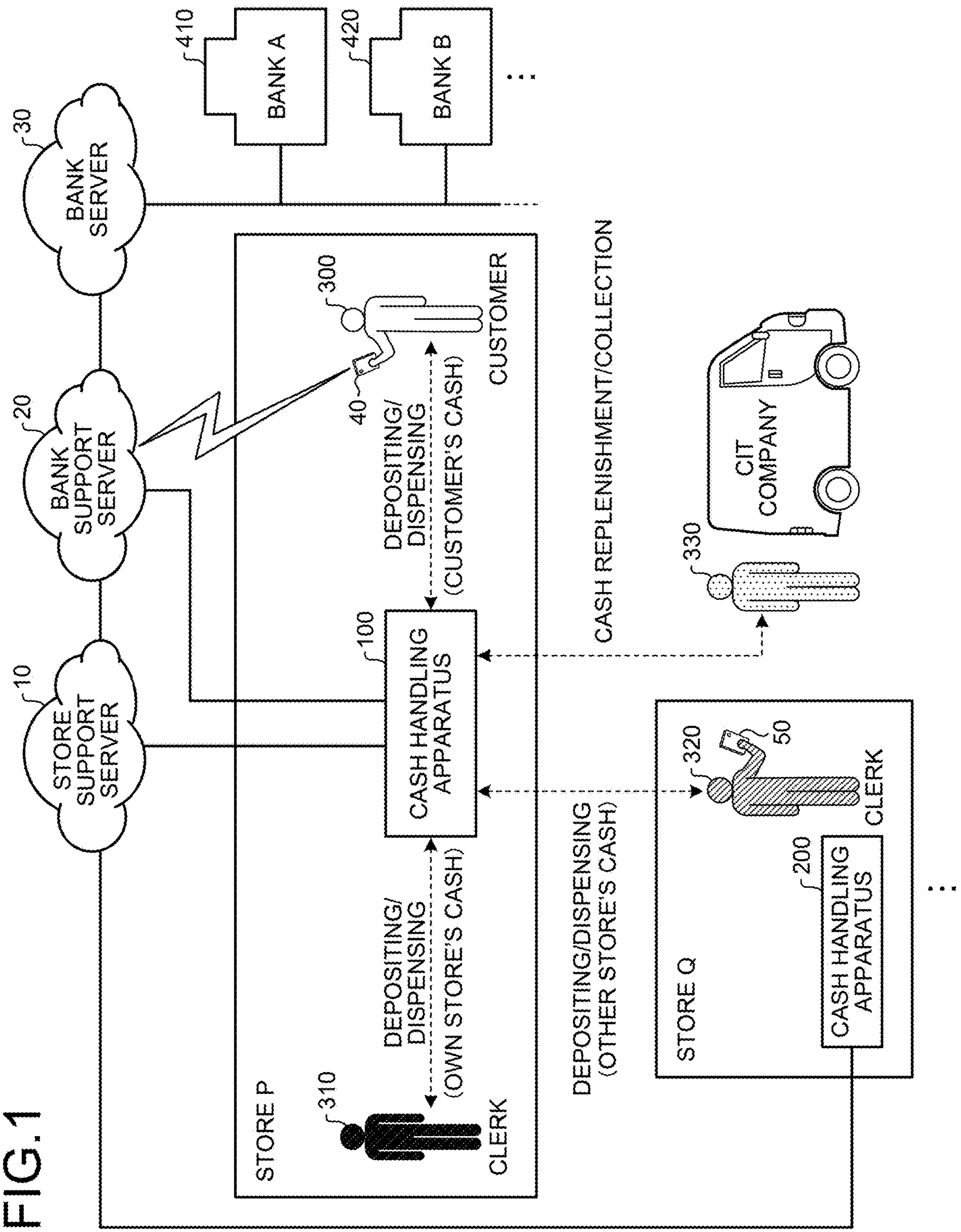
FIG. 1 shows a configuration example of a cash handling system according to the present embodiment.

Hereinafter, an embodiment of a cash handling system and a cash handling method according to the present disclosure will be described with reference to the accompanying drawings. The types and the number of stores using the cash handling system, the types and the number of cash handling apparatuses installed in each store, and the types and the number of users of the cash handling system are not particularly limited. In the present embodiment, a description will be continued with an example in which a cash handling apparatus 100 installed in a store P is used by a clerk 310 of the store P, a customer 300 visiting the store P, and a clerk 320 of another store Q where another cash handling apparatus 200 is installed, as shown in FIG. 1. Hereinafter, the store P where the cash handling apparatus 100 is installed may be referred to as an own store, and the store Q where the other cash handling apparatus 200 is installed may be referred to as another store.

FIG. 1 shows a configuration example of a cash handling system according to the present embodiment. The cash handling system includes cash handling apparatuses 100, 200 installed in a plurality of stores P, Q, respectively, and a store support server 10. The cash handling system may further include a bank support server 20.

The store support server 10 stores therein data on the inventory amounts of cash in the cash handling apparatuses 100, 200 installed in the stores P, Q. The store support server 10 may store and manage information such as the inventory amounts of cash in the other cash handling apparatuses, and/or the inventory amount of cash manually managed outside the cash handling apparatuses. The store support server 10 can support store operations related to cash management. The bank support server 20 can support handling related to bank accounts of a plurality of banks including a bank 410 and a bank 420, performed by using the cash handling apparatus 100 in the store P.

The handling related to bank accounts, i.e., handling related to bank transactions, includes handling that was conventionally performed by the ATM. The cash handling system can perform account handling leading to a bank account update, by using a bank server 30 that performs handling related to the bank accounts of the banks 410, 420. The bank support server 20 stores therein account information such as bank names, account numbers, and account holders, which are necessary for the account handling and have been registered in advance. The bank server 30 performs a process for updating a bank account, based on the account information transmitted from the bank support server 20 and data on the amount of cash deposited or withdrawn by the cash handling apparatus 100.

Handling related to a bank account, which is performed by the bank support server 20, includes at least the following processes. The bank support server 20 specifies a bank server 30 that updates the bank account, based on the account information received from the cash handling apparatus 100. The bank support server 20 transmits, to the specified bank server 30, data necessary for an account update process to be performed by the bank server 30. The data necessary for the account update process includes at least the account information, and the data on the amount of the deposited or withdrawn cash received from the cash handling apparatus 100. In addition, the bank support server 20 may perform, as handling related to a bank account, a process of specifying a bank account to be updated, based on data transmitted from communication terminals 40, 50 described later. Then, the bank support server 20 may transmit the data necessary for the account update process, to the bank server 30 corresponding to the specified bank account.

The cash handling system can be used with mobile communication terminals 40, 50 such as smartphones and tablets. For example, the customer 300 can start using a service provided by the bank support server 20 by operating the communication terminal 40, and can deposit or withdraw cash by using the cash handling apparatus 100 of the store P, similarly to a conventional ATM. The clerk 320 of another store Q can use the communication terminal 50 to reserve the content of cash handling to be performed by using the cash handling apparatus 100. Details of the processes performed with the communication terminals 40, 50 will be described later.

As shown in FIG. 1, the store support server 10 and each of the cash handling apparatuses 100, 200 of the stores P, Q are communicably connected to each other. The bank support server 20 and the cash handling apparatus 100 of the store P are communicably connected to each other. The store support server 10 and the bank support server 20 are communicably connected to each other. The bank support server 20 and the bank server 30 are communicably connected to each other. For example, the store support server 10, the bank support server 20, and the bank server 30 are configured in a real space or on the cloud by using a computer device including a control circuitry and a memory. Since such servers are conventionally known, detailed description of the configurations thereof will be omitted.

The cash handling apparatus 100 performs cash handling. The cash handling performed by the cash handling apparatus 100 includes a depositing process for receiving cash from outside the apparatus and storing the received cash inside the apparatus, and a dispensing process for dispensing designated cash stored inside the apparatus to the outside of the apparatus. A configuration example of the cash handling apparatus 100 will be described later.

As shown by a broken line in FIG. 1, the clerk 310 of the store P can use the cash handling apparatus 100 for depositing/dispensing cash for the own store P. The clerk 320 of the other store Q can use the cash handling apparatus 100 for depositing/dispensing cash for the store Q. The customer 300 visiting the store P may use the cash handling apparatus 100 for a dispensing process for withdrawing cash from a bank account and/or a depositing process for depositing cash into the bank account. That is, the cash handling apparatus 100 may be capable of performing a plurality of types of cash handling including cash handling related to store operations and cash handling related to bank transactions using bank accounts.

Figure 2:
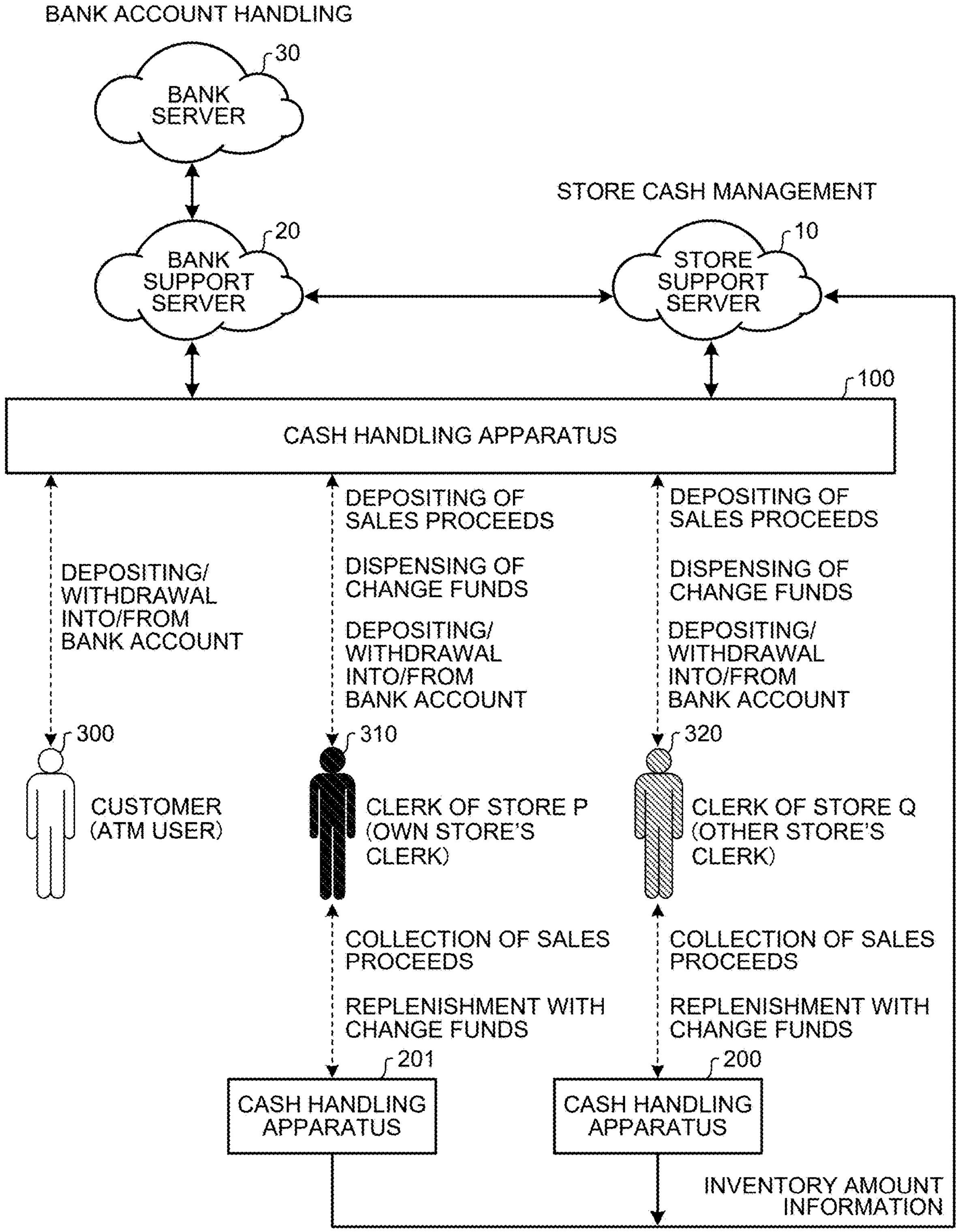
FIG. 2 shows an example of handling performed by using a cash handling apparatus.

FIG. 2 shows an example of handling performed by using the cash handling apparatus 100. The customer 300 can withdraw cash from a bank account and/or deposit cash into the bank account by using the cash handling apparatus 100 of the store P, similarly to the case of using an ATM.

The bank support server 20 specifies the bank account of the customer 300, based on information acquired from the customer 300 via the communication terminal 40. For example, the customer 300 registers information such as a user ID, a password, and a bank account in the bank support server 20 in advance. The bank support server 20 specifies the bank account of the customer 300, who has inputted the user ID and the password for performing a login process through an operation on the communication terminal 40, based on the information registered therein in advance.

In a case where the customer 300 having finished the login process performs a depositing process to deposit cash into the cash handling apparatus 100, the cash handling apparatus 100 recognizes and counts the cash deposited by the customer 300 and transmits information including the deposited amount to the bank support server 20. The bank support server 20 transmits information on the deposited amount and the bank account of the customer 300 to the bank server 30. The bank server 30 performs account handling and updates the account balance based on the received information, whereby the deposited amount is deposited into the bank account of the customer 300.

In a case where the customer 300 having finished the login process performs a dispensing process to withdraw cash from the cash handling apparatus 100, the cash handling apparatus 100 transmits information including the dispensed amount to the bank support server 20. The bank support server 20 transmits information on the dispensed amount and the bank account to the bank server 30. The bank server 30 performs account handling and updates the account balance based on the received information, whereby the dispensed amount is withdrawn from the bank account of the customer 300.

The clerk 310 of the store P can deposit, into the cash handling apparatus 100, sales proceeds of the store P collected from another cash handling apparatus 201 such as a change machine used in the store P, for example. The clerk 310 can dispense, from the cash handling apparatus 100, change funds to be used as change in the store P, and replenish the other cash handling apparatus 201 with the change funds.

The clerk 320 of the other store Q can go to the store P with sales proceeds collected from the cash handling apparatus 200 such as a cash register used in the store Q and deposit the sales proceeds into the cash handling apparatus 100, for example. The clerk 320 can dispense, from the cash handling apparatus 100, change funds to be used as change in the store Q, go back to the store Q, and replenish the cash handling apparatus 200 with the change funds.

In a case where the clerk 320 of the store Q performs a depositing process using the cash handling apparatus 100, the cash handling apparatus 100 transmits information including the deposited amount to the bank support server 20. The bank support server 20 transmits information on the deposited amount and the bank account of the store Q to the bank server 30. The bank server 30 performs account handling and updates the account balance based on the received information, whereby the deposited amount is deposited into the bank account of the store Q.

In a case where the clerk 320 of the store Q performs a dispensing process using the cash handling apparatus 100, the cash handling apparatus 100 transmits information including the dispensed amount to the bank support server 20. The bank support server 20 transmits information on the dispensed amount and the bank account of the store Q to the bank server 30. The bank server 30 performs account handling and updates the account balance based on the received information, whereby the dispensed amount is withdrawn from the bank account of the store Q.

For example, information such as user IDs and passwords to be used by the clerks 310, 320 of the stores P, Q, and the bank accounts of the stores P, Q, is registered in the bank support server 20 in advance. After the clerk 320 performs a login process of inputting the user ID and the password for the store Q into the cash handling apparatus 100, the bank support server 20 specifies the bank account of the store Q based on the information registered in advance. Thus, the bank support server 20 can instruct the bank server 30 to perform account handling.

The user who uses the cash handling apparatus 100 like an ATM is not limited to the customer 300. The clerk 310 of the store P may also use the cash handling apparatus 100 like an ATM to deposit into and/or withdraw from the bank account of the store P. Likewise, the clerk 320 of the store Q may also use the cash handling apparatus 100 like an ATM to deposit into and/or withdraw from the bank account of the store Q.

The store support server 10 supports operations on management of cash in the stores P, Q. The store support server 10 stores therein inventory amount information of the cash handling apparatus 100. The inventory amount information includes information that enables the specification of denominations, the quantity and amount for each denomination, and the total amount of cash of all denominations in the cash handling apparatus 100. Likewise, the store support server 10 can store therein inventory amount information of the other cash handling apparatus 201 installed in the store P, and inventory amount information of the cash handling apparatus 200 installed in the store Q. This allows the store support server 10 to manage denominations, the quantity and amount for each denomination, and the total amount of cash in each of the stores P, Q, in addition to the inventory amount information of each apparatus.

In a case where the customer 300, the clerk 310 of the store P, or the clerk 320 of the store Q deposits/dispenses cash to/from the cash handling apparatus 100, the cash handling apparatus 100 transmits denominations and the quantity for each denomination of the deposited/dispensed cash to the store support server 10. The store support server 10 updates the inventory amount information of the cash handling apparatus 100 based on the information received from the cash handling apparatus 100. Based on the inventory amount information, the store support server 10 can compute denominations and the quantity for each denomination of cash that can be deposited in the cash handling apparatus 100, and denominations and the quantity for each denomination of cash that can be dispensed from the cash handling apparatus 100.

When the inventory amount of cash in the cash handling apparatus 100 increases and satisfies a predetermined condition, cash is collected from the cash handling apparatus 100. When the inventory amount of cash in the cash handling apparatus 100 decreases and satisfies a predetermined condition, the cash handling apparatus 100 is replenished with cash. For example, a threshold value for performing cash collection and a threshold value for performing cash replenishment are set in advance for each denomination. If there is a denomination for which the quantity of cash has reached the threshold value, a CIT (cash-in-transit) company 330 visits the store P, and collects cash from the cash handling apparatus 100 or replenishes the cash handling apparatus 100 with cash, as shown in FIG. 1.

The cash handling system may handle the cash in the cash handling apparatus 100 separately as follows: cash possessed by the store P; cash possessed by the banks 410, 420 for depositing/withdrawal of cash by the customer 300; and cash possessed by the other store Q. In this case, cash deposited by the customer 300 into the cash handling apparatus 100 becomes cash possessed by the bank 410, 420 with which the customer 300 has a bank account, and is distinguished from the cash of the stores P, Q. When the customer 300 dispenses cash from the cash handling apparatus 100, the dispensing process is performed by using the cash possessed by the bank 410, 420 with which the customer 300 has a bank account. Likewise, a depositing/dispensing process by the clerk 310 of the store P is performed by using the cash possessed by the store P, and a depositing/dispensing process by the clerk 320 of the store Q is performed by using the cash possessed by the store Q. For example, the cash handling apparatus 100 may distinguish between the cash possessed by the store P, the cash possessed by the banks 410, 420 and deposited/dispensed by the customers 300, and the cash possessed by the other store Q, by storing them separately in different places inside the apparatus. For another example, the cash handling apparatus 100 may associate identification information of cash, such as banknote serial numbers, with information indicating whether the cash is possessed by the store P, the banks 410, 420, or the other store Q, to distinguish between them.

However, it is not always necessary to distinguish between the actual cash possessed by the store P, the banks 410, 420, and the other store Q, to handle the actual cash. The cash handling apparatus 100 may distinguish between information on the cash possessed by the store P, information on the cash possessed by the banks 410, 420 and deposited/dispensed by the customers 300, and information on the cash possessed by the other store Q, and store these pieces of information, instead of distinguishing between the actual cash.

Alternatively, in the cash handling system, the cash in the cash handling apparatus 100 can be handled as cash possessed by the store P where the cash handling apparatus 100 is installed. In this case, depositing/dispensing of cash into/from the cash handling apparatus 100 by the customer 300 and the clerk 320 of the other store Q is performed by using the cash possessed by the store P and therefore, account handling is performed for the cash handling to transfer the amount of the deposited/dispensed cash, between the bank account of the store P and the bank accounts of the customer 300 and the other store Q. Hereinafter, the description will be continued with this example in which cash inside the cash handling apparatus 100 is possessed by the store P.

In a case where the customer 300 deposits cash into the cash handling apparatus 100 to deposit an amount of the cash into the user's bank account, the bank support server 20 instructs the bank server 30 to perform account handling for transferring the deposited amount received from the cash handling apparatus 100, from the bank account of the store P to the bank account of the customer 300. The store support server 10 and the cash handling apparatus 100 handle the cash deposited into the cash handling apparatus 100 in the depositing process, as cash of the store P. Therefore, when the customer 300 performs the depositing process, it results in the same state as a state where the cash handling apparatus 100 is replenished with an amount of cash withdrawn from the bank account of the store P.

In a case where the customer 300 dispenses cash, of which the amount is withdrawn from a bank account, from the cash handling apparatus 100, the bank support server 20 instructs the bank server 30 to perform account handling for transferring the dispensed amount from the balance of the account of the customer 300 to the bank account of the store P. The store support server 10 and the cash handling apparatus 100 handle the cash dispensed from the cash handling apparatus 100 in the dispensing process, as cash of the store P. Therefore, when the customer 300 performs the dispensing process, it results in the same state as a state where the cash is collected from the cash handling apparatus 100 and deposited into the bank account of the store P.

Likewise, in a case where the clerk 320 of the other store Q deposits/dispenses cash into/from the cash handling apparatus 100, the bank support server 20 performs account handling for transferring the deposited amount from the bank account of the store P to the bank account of the store Q or transferring the dispensed amount from the bank account of the store Q to the bank account of the store P. When the clerk 320 of the other store Q performs the depositing process, it results in the same state as a state where the cash handling apparatus 100 is replenished with the cash withdrawn from the bank account of the store P. When the clerk 320 of the other store Q performs the dispensing process, it results in the same state as a state where the cash is collected from the cash handling apparatus 100 and deposited into the bank account of the store P. In the cash handling system, it is also possible to set a condition for the account handling to control the timing of performing the account handling, which will be described later.

Figure 3:
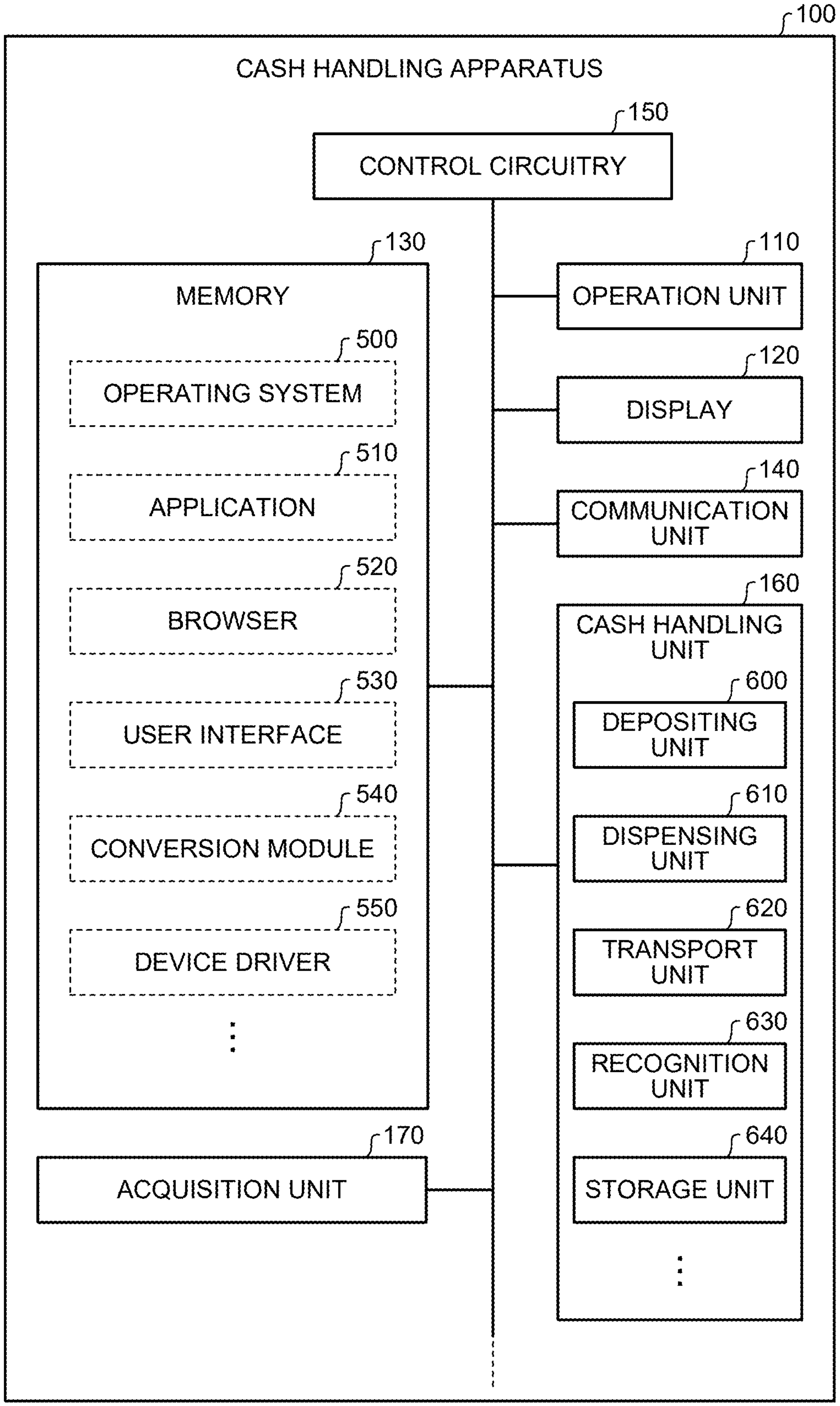
FIG. 3 is a block diagram showing a configuration example of the cash handling apparatus.

FIG. 3 is a block diagram showing a configuration example of the cash handling apparatus 100. The cash handling apparatus 100 includes an operation unit 110, a display 120, a memory 130, a communication unit 140, a control circuitry 150, and a cash handling unit 160.

The cash handling apparatus 100 may include an acquisition unit 170 that acquires information from outside the apparatus. When the cash handling apparatus 100 performs a process using an IC card, a card reader is used as the acquisition unit 170 corresponding to the IC card. When a process using a graphic code (code information) such as a barcode or a QR code (registered trademark) displayed on the screen of the communication terminal 40, 50 is performed, a code reader is used as the acquisition unit 170 corresponding to the graphic code. When a process using biometric information such as face, fingerprint, or vein is performed, a biometric authentication device is used as the acquisition unit 170 corresponding to the biometric information. For example, the acquisition unit 170 corresponding to the information to be acquired for user authentication is used to perform a login process for cash handling.

The operation unit 110 is used to input various kinds of information on cash handling. The display 120 is used to display the various kinds of information on cash handling. For example, the control circuitry 150 uses a touch-panel type liquid crystal display device as the operation unit 110 and the display 120. The control circuitry 150 can control the liquid crystal display device to display a user interface 530 for inputting information on cash handling.

The communication unit 140 is used to communicate with external devices. For example, communication with external devices is performed via a public line such as the Internet, or a dedicated line. The cash handling apparatus 100 can communicate with the store support server 10 and the bank support server 20 via the communication unit 140. The line through which the cash handling apparatus 100 communicates with the store support server 10 and the line through which the cash handling apparatus 100 communicates with the bank support server 20 may be the same line or may be different lines. Each line may be a public line or a dedicated line.

The memory 130 is a non-volatile storage device used to store various kinds of information necessary for the operation of the cash handling apparatus 100. The control circuitry 150 receives various kinds of information from the user via the operation unit 110 with the display 120, and controls the components based on the various kinds of information stored in the memory 130, thereby realizing the functions and operations of the cash handling apparatus 100 described in the present embodiment.

The cash handling unit 160 can perform a plurality of types of cash handling including a depositing process and a dispensing process. The cash handling unit 160 includes a depositing unit 600, a dispensing unit 610, a transport unit 620, a recognition unit 630, and one or more storage units 640. The depositing unit 600 can receive cash from the outside of the apparatus and feed out the cash into the apparatus. The transport unit 620 can transport the cash between the depositing unit 600, the dispensing unit 610, the recognition unit 630, and the storage unit 640. For example, the transport unit 620 may be configured to include one or more rollers and/or one or more belts. The recognition unit 630 can recognize the cash being transported by the transport unit 620. For example, denomination and authenticity of cash are recognized. The recognition unit 630 may recognize fitness of cash, i.e., the degree of damage which may be determined based on predetermined criteria. The recognition unit 630 may include a plurality of sensors. The sensors may include an image sensor and/or a magnetic sensor. The storage unit 640 can store therein the cash transported by the transport unit 620. For example, the cash is stored for each denomination in a plurality of storage units 640. The storage unit 640 can feed out the cash to be discharged to the outside of the apparatus. The storage unit 640 may be fixed to the cash handling unit 160 or may be configured to be dismountable from the cash handling unit 160. For example, the storage unit 640 may be a cassette or a stacker. The dispensing unit 610 can discharge the cash transported by the transport unit 620 to the outside of the apparatus. For example, the cash fed out from the storage unit 640 is discharged from the dispensing unit 610. For example, of the cash received in the depositing unit 600 and fed out therefrom into the apparatus, cash recognized as a type that cannot be stored in the storage unit 640 is discharged from the dispensing unit 610.

For example, during the depositing process, the cash received at the depositing unit 600 is transported by the transport unit 620. After the cash is recognized for denominations and counted by using the recognition unit 630, the cash is stored in the storage unit 640. For example, during the dispensing process, the cash in the storage unit 640 is fed out therefrom and transported by the transport unit 620. After the cash is recognized for denominations and counted by using the recognition unit 630, the cash is discharged from the dispensing unit 610 to the outside of the apparatus. The cash handling unit 160 may perform other types of cash handling, such as a replenishment process for replenishing the storage unit 640 with cash, a collection process for collecting cash from the storage unit 640 to the outside of the apparatus, and an exchange process in which cash is deposited and a deposited amount of the cash is dispensed using cash of a denomination different from that of the deposited cash.

The control circuitry 150 includes an I/F circuit and one or more arithmetic processing units, such as a CPU (Central Processing Unit) or an MPU (Micro-Processing Unit). The arithmetic processing unit reads and executes a program stored in the memory 130. The I/F circuit inputs and outputs electrical signals between the control circuitry 150 and each device connected to the control circuitry 150. The control circuitry 150 executes the program to integrally control the entire cash handling apparatus 100.

As shown by broken lines in FIG. 3, data on an operating system 500, an application 510, a browser 520, a user interface 530, a conversion module 540 that converts the formats of instructions and data, a device driver 550, etc., are stored in the memory 130. For example, the control circuitry 150 loads and executes programs and data stored in the memory 130 in advance, thereby realizing the functions of the operating system 500, the application 510, the browser 520, the user interface 530, the conversion module 540, the device driver 550, etc.

Figure 4:
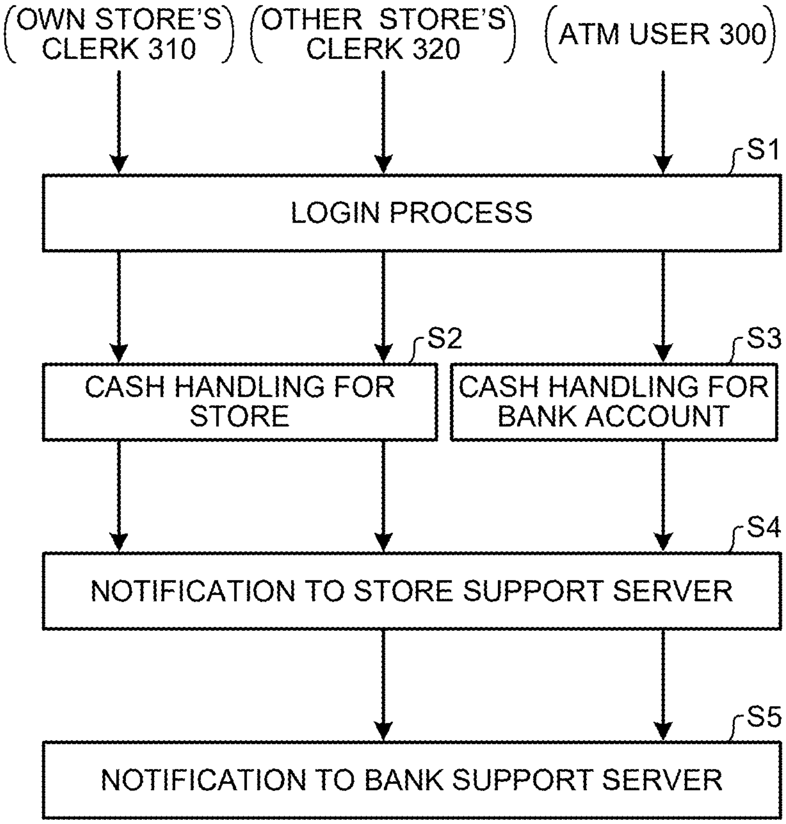
FIG. 4 illustrates handling performed in the cash handling system.

FIG. 4 illustrates processes performed in the cash handling system. In FIG. 4, processes performed corresponding to each of the cash handling system users, including the clerk 310 of the store P, the clerk 320 of the other store Q, and the customer 300 visiting the store P, are indicated by arrows pointing downward from the respective users.

When the user of the cash handling apparatus 100 has performed a login process (step S1), an authentication process for the login user is performed to determine the type of the user. According to the determination result, cash handling related to the stores P, Q (step S2) or cash handling related to bank accounts (step S3) is performed. For example, the user login may be realized by the control circuitry 150 performing the authentication process based on identification information acquired via a card reader, a code reader, or a biometric authentication device.

Specifically, when the login user is the clerk 310 of the own store P or the clerk 320 of the other store Q, the login user can perform, with the cash handling apparatus 100, processes related to cash for the store P or Q, such as depositing of sales proceeds and dispensing of change funds (step S2). Meanwhile, when the login user is the customer 300 who uses the cash handling apparatus 100 like an ATM, the login user can perform, with the cash handling apparatus 100, processes related to bank transactions, such as withdrawal from a bank account, depositing into the bank account, and account update (step S3).

After performing the cash handling, information that enables the specification of the denominations and the quantity for each denomination of the deposited/dispensed cash is transmitted from the cash handling apparatus 100 to the store support server 10 to update the inventory amount information of the cash handling apparatus 100, which has changed due to the cash depositing process or the cash dispensing process (step S4). According to need, the deposited amount or the dispensed amount of cash and information necessary for the account update process are transmitted from the cash handling apparatus 100 to the bank support server 20 to perform an account update process (step S5). The account update process is performed by the bank server 30 having received the necessary information from the bank support server 20.

For example, when the login user is the clerk 320 of the other store Q and has performed a depositing process, account handling is performed to transfer the deposited amount from the bank account of the store P having the ownership of the cash stored in the cash handling apparatus 100, to the bank account of the store Q. When the clerk 320 of the other store Q has performed a dispensing process, account handling is performed to transfer the dispensed amount from the bank account of the store Q to the bank account of the store P. When the login user is the customer 300 and has performed a depositing process, account handling is performed to transfer the deposited amount from the bank account of the store P to the bank account of the customer 300. When the customer 300 has performed a dispensing process, account handling is performed to transfer the dispensed amount from the bank account of the customer 300 to the bank account of the store P where the cash handling apparatus 100 is installed.

Figure 5A:
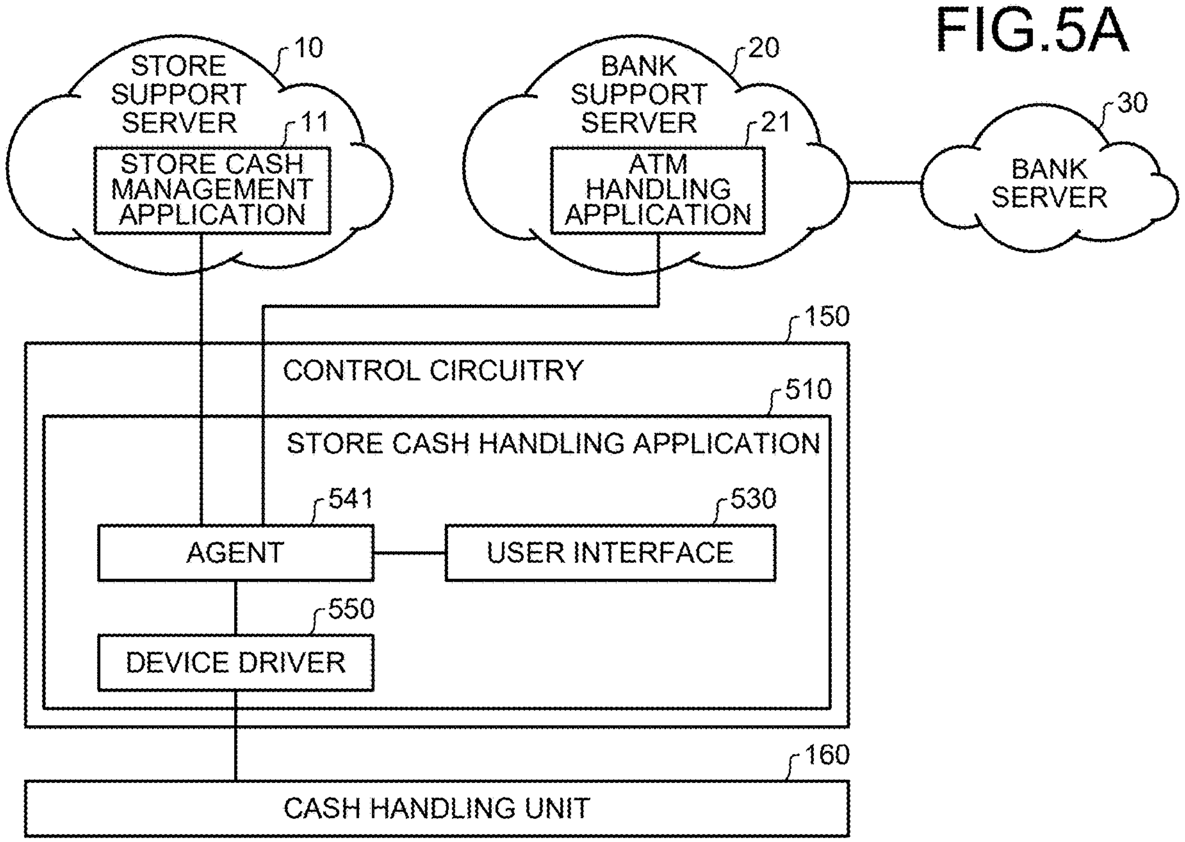
FIGS. 5A and 5B illustrate methods for performing the handling shown in FIG. 4.
Figure 5B:
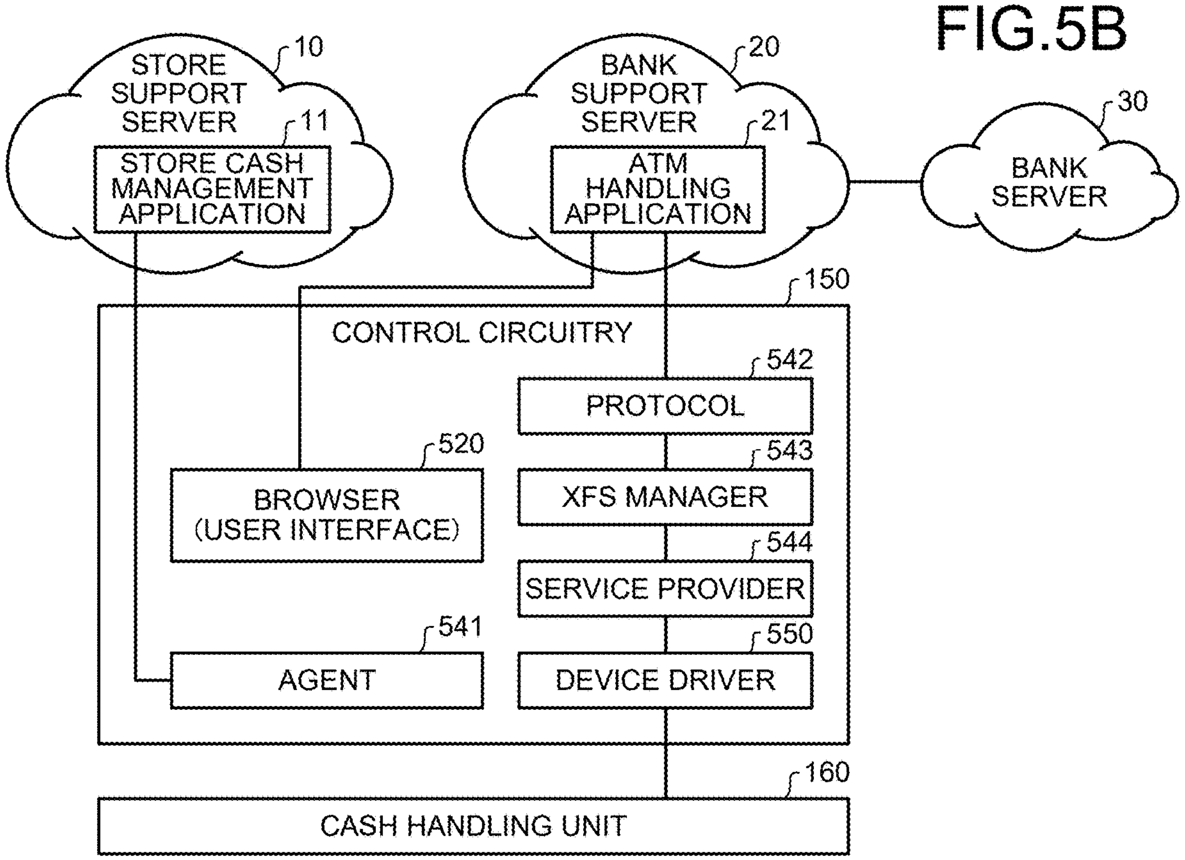

FIGS. 5A and 5B illustrate methods for performing the processes shown in FIG. 4. FIG. 5A shows an example of a case where the clerk 310 of the store P and the clerk 320 of the other store Q perform cash handling using the cash handling apparatus 100, and FIG. 5B shows an example of a case where the customer 300 performs cash handling using the cash handling apparatus 100. FIGS. 5A and 5B are for explaining examples of methods performed by the cash handling apparatus 100, and do not limit the methods.

As shown in FIG. 5A, in a case where the cash handling apparatus 100 is used by the clerk 310 of the store P and the clerk 320 of the other store Q, the processes are mainly carried out by the application 510 for handling cash of the stores P, Q, which is executed by the control circuitry 150 of the cash handling apparatus 100. The application 510 realizes the user interface 530 related to cash handling of the stores P, Q, and allows the clerks 310, 320 to input instructions and/or to confirm information through the user interface 530 using the operation unit 110 and the display 120. The application 510 controls the cash handling unit 160 via the device driver 550, whereby the cash handling unit 160 performs cash handling based on the contents inputted through the user interface 530. The control circuitry 150 acquires information related to cash handling of the stores P, Q to realize the user interface 530 and displays the user interface 530 on the display 120, by executing the application 510.

The store support server 10 executes the application 11 for managing the cash of the stores P, Q, to manage inventory amount information including denominations, the quantity for each denomination, the total amount, etc., of the cash in the cash handling apparatus 100. The application 510 of the cash handling apparatus 100 transmits data on cash handling to the store support server 10 via an agent 541 which is one of conversion modules 540 for converting instructions and data. Based on the received data, the application 11 of the store support server 10 updates the inventory amount information of the cash handling apparatus 100. Even in cases where different formats of instructions and/or data are used in a plurality of applications, the instructions and data can be exchanged by using the agent 541, allowing processes to proceed smoothly between the plurality of applications.

When processes related to bank accounts need to be performed, the application 510 of the cash handling apparatus 100 transmits data on cash handling to the bank support server 20 via the agent 541. The bank support server 20 executes an application 21 for ATM handling for performing processes related to bank accounts. Based on the data received from the cash handling apparatus 100, the application 21 specifies an amount of cash deposited/dispensed by using the cash handling apparatus 100 and bank accounts as a source and a destination of the amount, and transmits data necessary for account handling to the bank server 30. Thus, account handling is performed based on the received data in the bank server 30.

In a case where the customer 300, who wants to use an ATM, is a user of the cash handling apparatus 100, a login process for the customer is performed by using the communication terminal 40 through the application 21 for ATM handling executed by the bank support server 20, and thereafter cash handling is performed by the cash handling apparatus 100. The processes executed from the login of the customer 300 to the start of the cash handling will be described later.

As shown in FIG. 5B, when performing cash handling related to the bank account of the customer 300, the processes using the browser 520 executed by the control circuitry 150 of the cash handling apparatus 100 are mainly carried out by the application 21 executed by the bank support server 20. The browser 520 running on the cash handling apparatus 100 functions as a user interface of the application 21. Via the browser 520, the customer 300 can perform confirmation and input operations for information necessary to deposit/withdraw cash into/from the bank account. The control circuitry 150 acquires information for the browser 520 from the bank support server 20 and displays the browser 520 on the display 120.

In other words, the cash handling apparatus 100 can execute the first application 510 as a native application when handling cash in the store and execute the second application as a web application using the browser 520 when handling cash related to the bank account of the customer 300. The native application is an application that the cash handling apparatus 100 can execute by loading a program stored inside the apparatus. Even when the cash handling apparatus 100 is in an offline state in which the cash handling apparatus 100 cannot communicate with the other apparatuses, the cash handling apparatus 100 can execute the native application. Meanwhile, the web application is an application that allows the use of an application, which is executed by an apparatus other than the cash handling apparatus 100 by loading a program stored in that apparatus, from the cash handling apparatus 100 communicably connected to that apparatus. When the cash handling apparatus 100 is in the offline state and cannot communicate with the other apparatuses, even if the web application is executed on the cash handling apparatus 100, functions provided by the application executed by the other apparatus cannot be used from the cash handling apparatus 100.

The cash handling apparatus 100 is configured to perform cash handling upon receiving an instruction directly from the bank support server 20. When the customer 300 operates the browser 520 to determine the content of cash handling, the application 21 of the bank support server 20 instructs the cash handling apparatus 100 to perform the cash handling. The instruction is transmitted/received via a protocol 542, an XFS manager 543, and a service provider 544, which function as a conversion module 540 between the application 21 and the cash handling apparatus 100. The XFS manager 543 is an interface established as a standard for realizing an ATM function, and the cash handling apparatus 100 is configured to operate based on XFS. The control circuitry 150 of the cash handling apparatus 100 receives an instruction from the application 21 of the bank support server 20 which has sent the instruction according to the protocol 542, and executes the received instruction by using the XFS manager 543 and the service provider 544 to control the cash handling unit 160 via the device driver 550. The cash handling unit 160 performs the cash handling based on the content inputted by the customer 300 via the browser 520.

After performing the cash handling, the control circuitry 150 transmits data on the cash handling to the store support server 10 via the agent 541, and the application 11 of the store support server 10 having received the data updates the inventory amount information of the cash handling apparatus 100. The application 21 of the bank support server 20 transmits data necessary for account handling to the bank server 30, and processes related to the account handling are performed based on the received data in the bank server 30.

Figure 6:
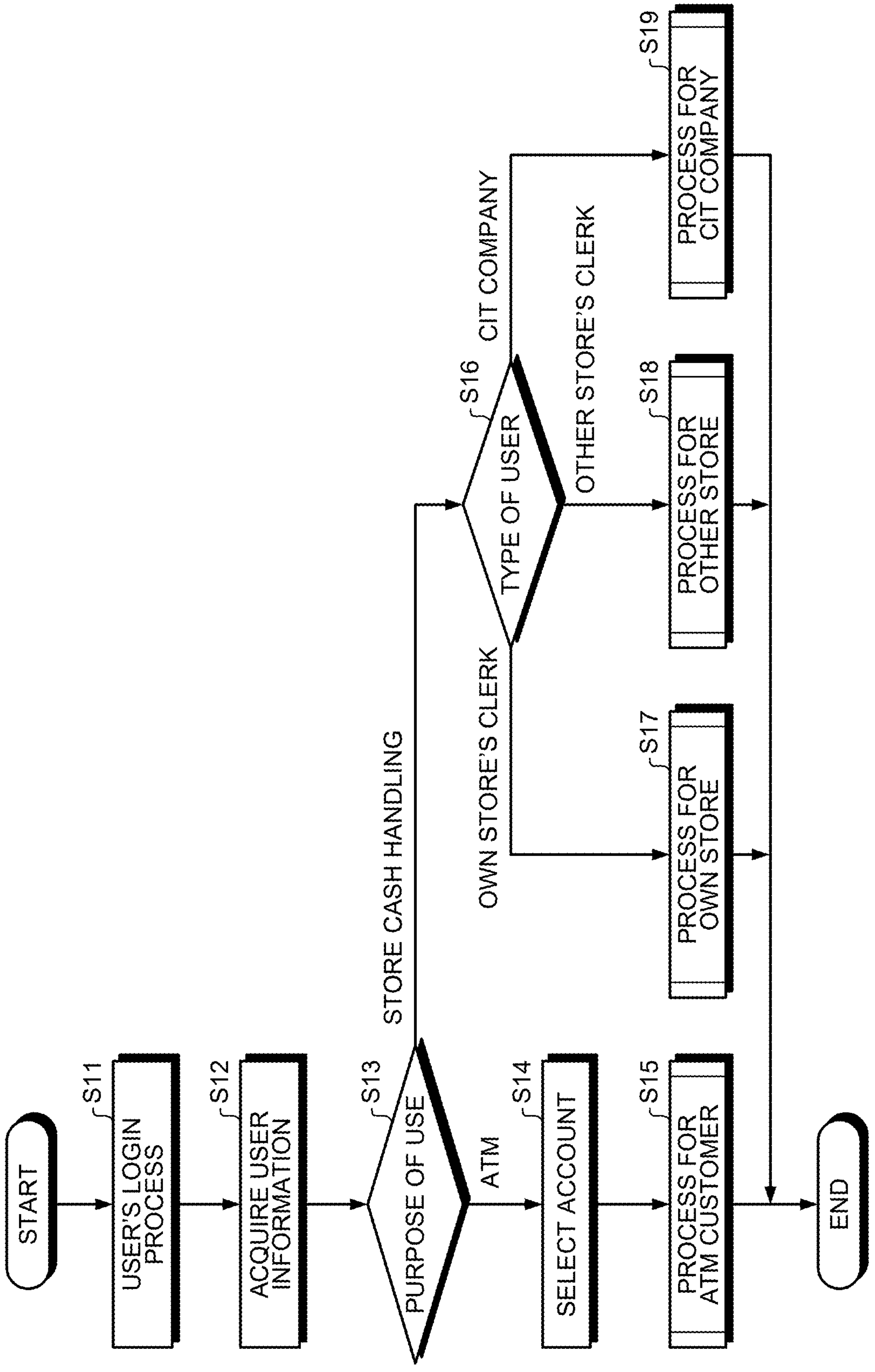
FIG. 6 is a flowchart showing a flow of handling performed in the cash handling system.

Next, a specific example of cash handling performed in the cash handling system will be described with reference to FIG. 6 to FIG. 12. FIG. 6 is a flowchart showing a flow of processes performed in the cash handling system. After a user login process is performed in the cash handling system (step S11) and user information is acquired (step S12), the purpose of use of the cash handling apparatus 100 is determined (step S13). This determination is also determination of the type of user.

For example, the customer 300, who wants to withdraw cash from a bank account or deposit cash into the bank account, connects the communication terminal 40 to the bank support server 20, performs the login process, and then starts operating the cash handling apparatus 100. In this case, it is determined that the purpose of the login user, i.e., the customer 300, is to use the cash handling apparatus 100 as an ATM. Based on the determination result, a process for selecting the bank account of the customer 300 is performed (step S14), and a process for the ATM customer is performed (step S15) to end the series of processes.

For example, when any of the clerk 310 of the store P, the clerk 320 of the other store Q, and the person of the CIT company 330 has performed the login process with the operation unit 110 and the display 120 of the cash handling apparatus 100, it is determined that the purpose of the login user is cash handling for the stores P, Q. Furthermore, according to the type of the login user (step S16), the corresponding process is performed. A process for own store is performed when the login user is the clerk 310 of the store P (step S17), a process for another store is performed when the login user is the clerk 320 of the other store Q (step S18), and a process for CIT company is performed when the login user is the person of the CIT company 330 (step S19), whereby the series of processes ends.

Figure 7A:
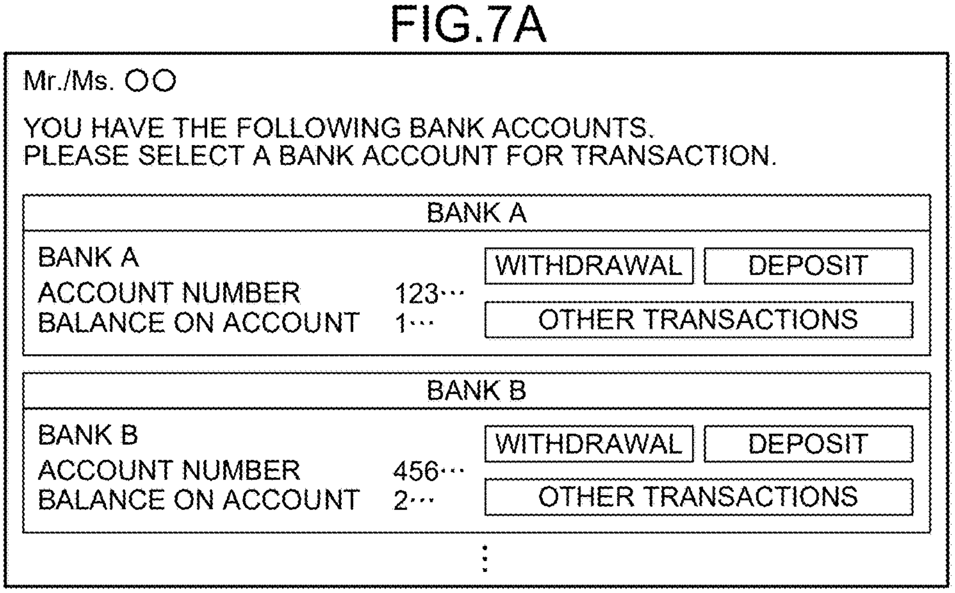
FIGS. 7A, 7B and 7C show examples of screens displayed when a customer uses the cash handling apparatus.
Figure 7B:
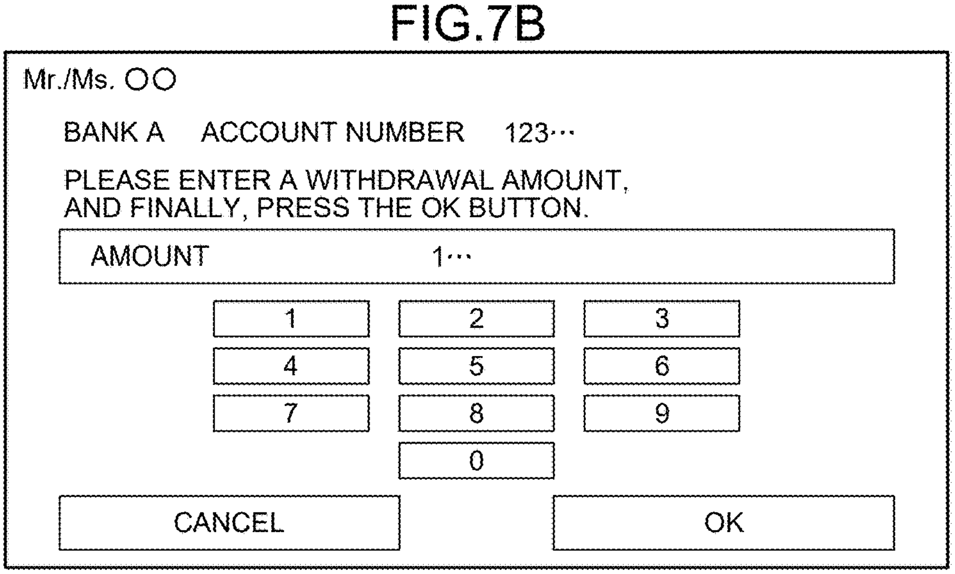
Figure 7C:
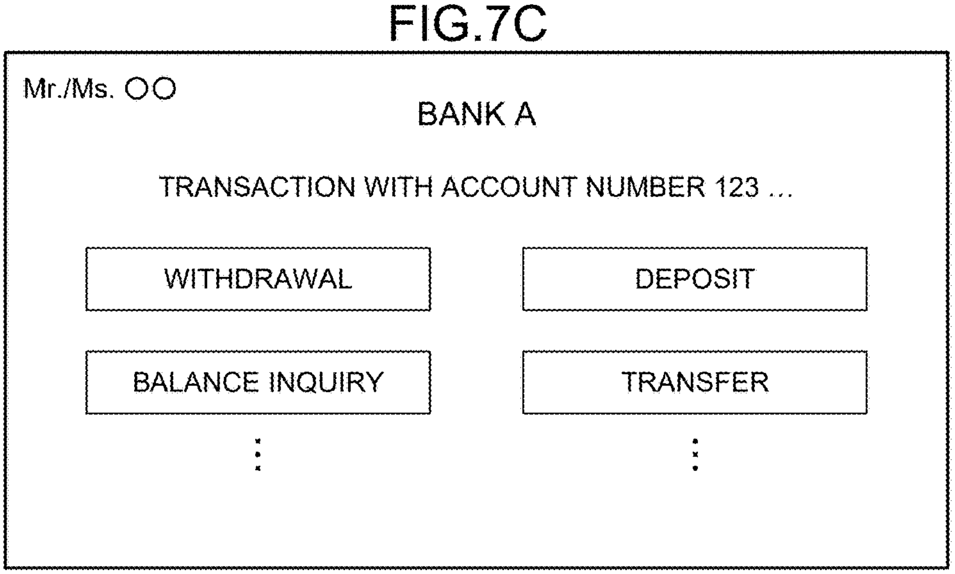

The cash handling apparatus 100 can perform different processes according to the type of the user. FIGS. 7A, 7B and 7C show examples of a screens displayed on the display 120 of the cash handling apparatus 100 when the customer 300 uses the cash handling apparatus 100. For example, the user interface is realized by the browser 520 on the cash handling apparatus 100 as described with reference to FIG. 5B, and the control circuitry 150 acquires information to realize the screens shown in FIGS. 7A to 7C and displays these screens on the display 120 of the cash handling apparatus 100.

If the customer 300 has a plurality of bank accounts, the screen for selecting a bank account for cash handling is displayed as shown in FIG. 7A. The bank support server 20 manages information on the bank accounts of the customer 300 who uses the cash handling system. The customer 300 can register a plurality of bank accounts in the bank support server 20 in advance. If the customer 300, who has finished the login process, has registered a plurality of bank accounts, information on these bank accounts of the customer 300 is listed and displayed as shown in FIG. 7A. The customer 300 can select the bank account, from/into which cash is to be withdrawn/deposited, from among the listed and displayed bank accounts, and start cash handling for the selected bank account.

For example, if the customer 300 wants to withdraw cash from a bank account at a bank A, the customer 300 presses a button labeled "Withdraw" displayed together with account information of the bank A on the screen shown in FIG. 7A, whereby a screen for designating a monetary amount is displayed as shown in FIG. 7B. After the customer 300 inputs a monetary amount that he/she wants to withdraw and presses an OK button, the cash handling apparatus 100 dispenses cash of the inputted monetary amount. The store support server 10 updates the inventory amount information of the cash handling apparatus 100, based on denominations and the quantity for each denomination of the dispensed cash. The bank support server 20 instructs the bank server 30 to perform account handling for the bank account of the customer 300 at the bank A, based on the amount of the dispensed cash. The bank server 30 performs account handling corresponding to the cash withdrawal from the bank account of the customer 300 at the bank A. As a result, the balance on the bank account of the customer 300 is updated.

When the customer 300 wants to deposit cash into the bank account at the bank A, the customer 300 presses a button labeled "Deposit" displayed together with the account information of the bank A on the screen shown in FIG. 7A, and deposits cash into the cash handling apparatus 100. The cash handling apparatus 100 recognizes and counts the deposited cash, and specifies denominations and the quantity for each denomination of the deposited cash. The store support server 10 updates the inventory amount information of the cash handling apparatus 100, based on the denominations and the quantity for each denomination of the deposited cash. The bank support server 20 instructs the bank server 30 to perform account handling for the bank account of the customer 300 at the bank A, based on the amount of the deposited cash. The bank server 30 performs account handling corresponding to the cash depositing into the bank account of the customer 300 at the bank A. As a result, the balance on the bank account of the customer 300 is updated.

As shown in FIG. 7A, regarding account handling to be frequently performed, such as withdrawal from a bank account and depositing into a bank account, buttons for directly performing each account handling are displayed on the screen. Thus, the customer 300 can simultaneously select a bank account and the type of account handling through one selection operation, instead of selecting a bank account and then selecting the type of account handling such as withdrawal or depositing. If the customer 300 wants to perform account handling whose button is not displayed on the screen shown in FIG. 7A, the customer 300 presses a button labeled "Other transactions" on the screen, whereby types of account handling that can be performed by the customer 300 are listed and displayed as shown in FIG. 7C. The customer 300 can select a type of account handling and perform the selected account handling in the same way as when using a conventional ATM.

Figure 8:
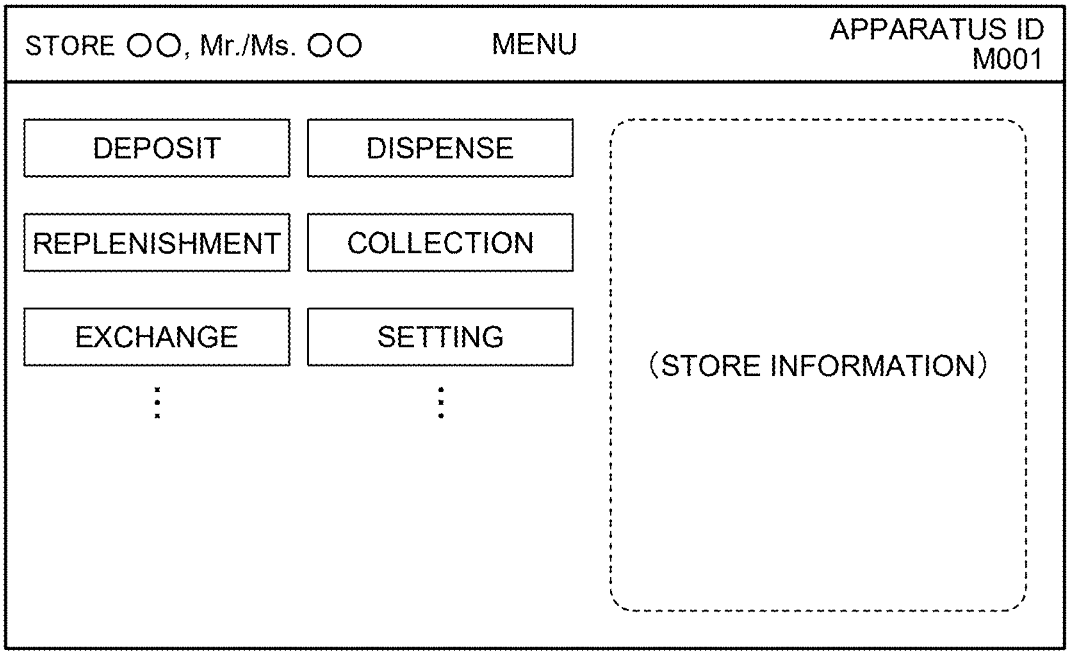
FIG. 8 shows an example of a screen displayed when a clerk uses the cash handling apparatus.

FIG. 8 shows an example of a screen displayed on the display 120 of the cash handling apparatus 100 when the clerks 310, 320 use the cash handling apparatus 100. For example, the cash handling apparatus 100 executes the application 510 for handling cash for the stores P, Q as described with reference to FIG. 5A, whereby the control circuitry 150 acquires information to realize the screen shown in FIG. 8 and displays the screen on the display 120 of the cash handling apparatus 100.

As shown in FIG. 8, a cash handling menu for the stores P, Q is displayed on the screen. In the cash handling menu, types of cash handling that can be performed by the cash handling apparatus 100, such as depositing and dispensing, are listed and displayed. In addition to the cash handling menu, store information on the store P, Q to which the clerk 310, 320 belongs is displayed in an area surrounded by a broken line in FIG. 8.

The store support server 10 manages information on the stores P, Q using the cash handling system. FIG. 9 shows an example of store information managed by the store support server 10. As shown in FIG. 9, the store support server 10 can store therein store IDs (store identification information) of a plurality of stores, apparatus IDs (apparatus identification information) of one or more cash handling apparatuses installed in each store, and information on cash stored in each cash handling apparatus. The information on cash includes inventory amount information, replenishment information, and collection information of the cash stored in each cash handling apparatus.

The inventory amount information is information that enables the specification of denominations, the quantity for each denomination, and the total amount of cash in each cash handling apparatus. The inventory amount information also includes time-series data obtained by recording changes in the quantity of cash for each denomination in chronological order.

The replenishment information is information for determining whether each cash handling apparatus needs to be replenished with cash. For example, a threshold quantity of cash at which replenishment is required is set for each denomination of the cash stored in the cash handling apparatus 100. When the cash handling apparatus 100 performs cash handling and the quantity of cash decreases and reaches the threshold quantity, it is determined that replenishment is necessary. For example, upon determining that the replenishment is necessary, the cash handling apparatus 100 executes a process for notifying the clerk 310 of the store P that the apparatus needs to be replenished with cash. Furthermore, for example, in order to secure cash that can be used by the store P, the cash handling apparatus 100 limits the types of cash handling that can be performed in the apparatus. For example, acceptance of a request from the customer 300 to perform a dispensing process for cash withdrawn from the bank account is suspended.

The collection information is information for determining whether cash needs to be collected from each cash handling apparatus. For example, a threshold quantity of cash at which collection is required is set for each denomination of cash stored in the cash handling apparatus 100. When the cash handling apparatus 100 performs cash handling and the quantity of cash increases and reaches the threshold quantity, it is determined that collection is necessary. For example, upon determining that the collection is necessary, the cash handling apparatus 100 executes a process for notifying the clerk 310 of the store P that cash needs to be collected. Furthermore, for example, in order to avoid a situation where the cash handling apparatus 100 is full of cash and cannot perform cash handling, the cash handling apparatus 100 limits the types of cash handling that can be performed in the apparatus. For example, acceptance of a request from the customer 300 to perform a depositing process for cash to be deposited into the bank account is suspended.

Based on the store information shown in FIG. 9, the cash handling apparatus 100 can display information on the store P, Q, to which the clerk 310, 320 having started cash handling belongs, in the area surrounded by the broken line in FIG. 8. FIG. 10 shows an example of the store information displayed when the clerk 310, 320 uses the cash handling apparatus 100.

For example, the control circuitry 150 acquires, from the store support server 10, information including: information on cash in a store corresponding to the store P, Q to which the clerk 310, 320 having started cash handling belongs; and information on cash in each of cash handling apparatuses installed in the store, to realize the information shown in FIG. 10, and displays the information shown in FIG. 10 in the store information display area shown in FIG. 8. FIG. 10 shows an example of store information displayed for a store having a cash handling apparatus called a front machine and a cash handling apparatus called a back machine.

On a table labeled "In-store cash", cash in the store is separated into the numbers and amounts of banknotes and coins stored in the front machine and the numbers and amounts of banknotes and coins stored in the back machine. Beneath them, the total number and the total amount of these banknotes and coins are displayed.

On a table labeled "front machine", under the item "inventory amount", denominations, and the quantity and amount for each denomination of cash stored in each of a plurality of front machines are displayed, and the total quantity and the total amount of the cash stored in these front machines are displayed in the lowermost row of the table. Under the item "replenishment required", a denomination for which replenishment is required and the quantity of cash for replenishment are displayed. For example, if there is a denomination whose quantity is less than the threshold quantity for replenishment, this denomination is displayed, and a difference between the current quantity and a predetermined quantity, which is set in advance as a quantity of cash to be stored in the front machine, is displayed as a replenishment quantity. Under the item "collection required", a denomination for which collection is required and the quantity of cash to be collected are displayed. For example, if there is a denomination whose quantity exceeds the threshold quantity for collection, this denomination is displayed, and a difference between the current quantity and a predetermined quantity, which is set in advance as a quantity of cash to be stored in the front machine, is displayed as a collection quantity. On a table labeled "back machine", similarly to the front machine, under the items "inventory amount", "replenishment required", and "collection required", the corresponding information is displayed for each back machine. The clerk 310, 320 can determine: the type of cash handling to be performed; the amount of cash to be deposited/dispensed through the cash handling; the breakdown for each denomination of cash to be dispensed; and the like, while checking the store information on the screen shown in FIG. 8. Based on the information displayed under the items "inventory amount", "replenishment required", and "collection required", the cash handling apparatus 100 may change the display of the cash handling menu. The cash handling apparatus 100 may limit denominations, and/or the quantity for each denomination of cash that the clerks 310, 320 can select, based on the information under these items.

Figure 11:
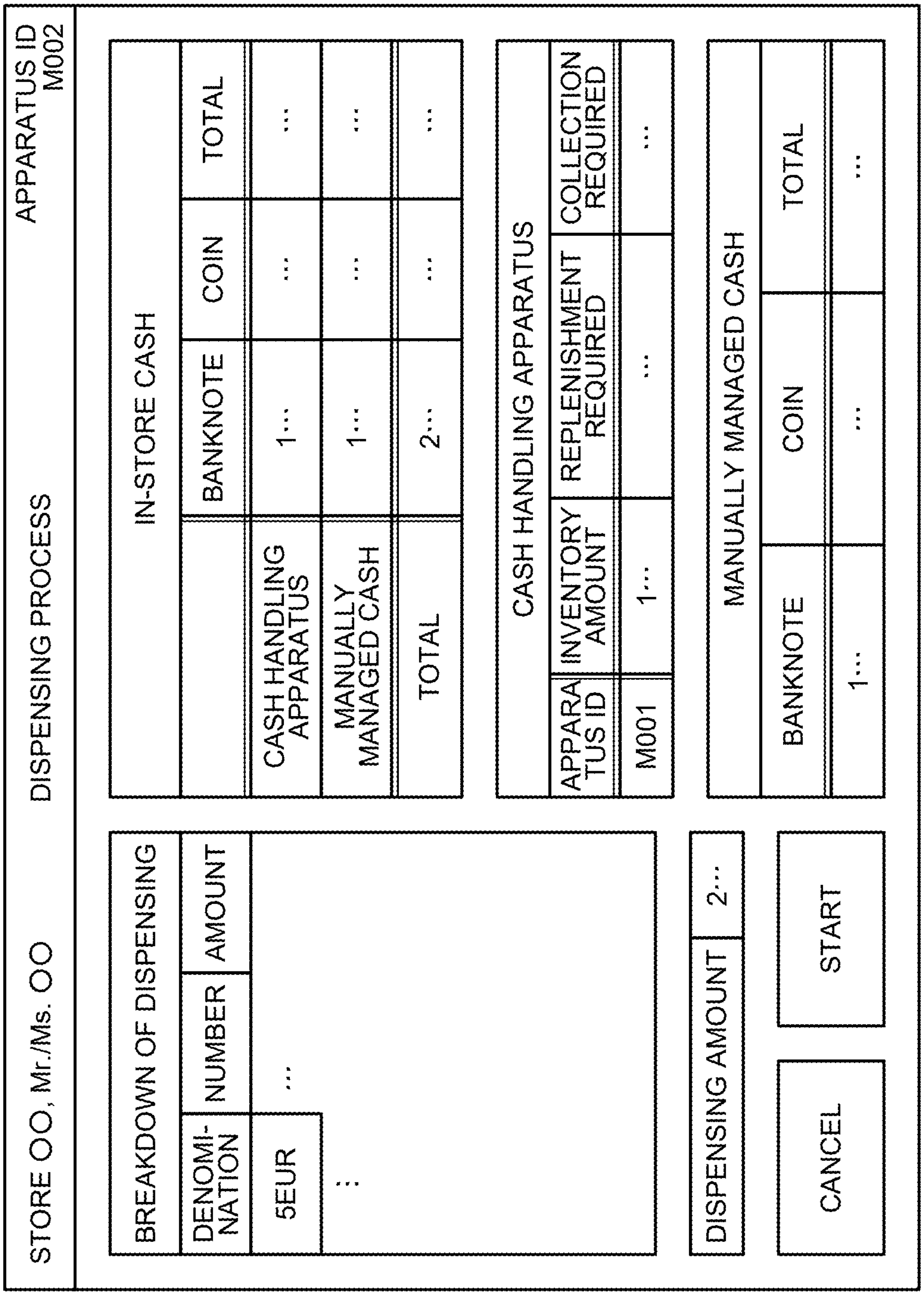
FIG. 11 shows an example of a screen displayed when a clerk of another store uses the cash handling apparatus.

FIG. 11 shows an example of a screen displayed on the display 120 of the cash handling apparatus 100 when the clerk 320 of the other store Q uses the cash handling apparatus 100. When the clerk 320 has selected a dispensing process on the screen shown in FIG. 8, the control circuitry 150 acquires information to realize the screen shown in FIG. 11 corresponding to the dispensing process, and displays the screen on the display 120. On a table labeled "cash handling apparatus", similarly to the "front machine" and the "back machine" shown in FIG. 10, information on cash in the cash handling apparatus 200 of the other store Q is displayed.

When there is cash to be managed without using the cash handling apparatus 200, the clerk 320 of the other store Q can transmit information on the cash to the store support server 10 via the cash handling apparatus 200. In this case, the store support server 10 also stores therein inventory amount information of the cash managed outside the cash handling apparatus 200 in the store Q, in addition to inventory amount information of cash in the cash handling apparatus 200 of the store Q. As a result, as shown in FIG. 11, on the screen of the cash handling apparatus 100, the information on the cash managed outside the cash handling apparatus 200 is displayed as inventory amount information of manually managed cash, in addition to the inventory amount information of the cash handling apparatus 200 in the store Q. On a table labeled "manually managed cash", denominations, and the quantity and amount for each denomination of the cash manually managed in the store Q are displayed.

The clerk 320 can designate denominations, and the quantity or amount for each denomination of cash to be dispensed from the cash handling apparatus 100, while checking information on cash in the store Q. The clerk 320 can determine cash to be dispensed, based on information displayed under the item "replenishment required" on the table labeled "cash handling apparatus". For example, when information indicating that replenishment with 30 5-euro notes is necessary is displayed under the item "replenishment required", the clerk 320 can determine that the number of 5-euro notes to be dispensed is 30. The clerk 320 can also determine cash to be dispensed, based on information on the table labeled "manually managed cash". For example, even when the information indicating that the cash handling apparatus 200 of the store Q needs to be replenished with 30 5-euro notes is displayed, if information indicating that the number of 5-euro notes manually managed in the store Q is 10 is displayed, the clerk 320 can determine that the number of 5-euro notes to be dispensed is 20.

By operating the operation unit 110, the clerk 320 can input denominations, and the quantity or amount for each denomination of cash to be dispensed, in a table labeled "breakdown of dispensing" on the left side of the screen shown in FIG. 11. On the screen, the amount of cash to be dispensed, which is automatically calculated based on the breakdown in the table labeled "breakdown of dispensing" designated by the clerk 320, is displayed. The clerk 320, who has determined the amount of cash to be dispensed and the breakdown of the cash, presses a start button on the screen to perform a dispensing process. Thus, the clerk 320 can cause the cash handling apparatus 100 to dispense cash in the denominations and quantities of the breakdown required by the store Q, and take the dispensed cash back to the store Q. In this case, based on the information displayed under the items "inventory amount", "replenishment required", and "collection required", the cash handling apparatus 100 may limit, for each denomination, the quantity of cash that the clerk 320 can designate. For example, on the input screen for the dispensing process, the quantity that can be designated by the clerk 320 is limited to the quantity displayed under the item "replenishment required". For example, if the quantity of cash exceeding the quantity displayed under the item "replenishment required" is designated by the clerk 320, the cash handling apparatus 100 may notify the clerk 320 of this fact by changing the color of the screen and/or the text. For another example, if a denomination displayed under the item "replenishment required" is selected by the clerk 320, the cash handling apparatus 100 may automatically update the display of the table labeled "breakdown of dispensing" by reflecting the denomination and the quantity displayed under the item "replenishment required" into the input area being currently selected. If an apparatus to be replenished with cash is selected from among the apparatuses whose inventory amounts are displayed on the screen, the cash handling apparatus 100 may automatically update the display of the table labeled "breakdown of dispensing" by reflecting the denomination and the quantity displayed under the item "replenishment required" of the selected apparatus into the input areas being currently selected. The cash handling apparatus 100 may change, for each denomination, limitation on the quantity of cash that can be entered (selected) by the clerk 320, according to the selected apparatus. That is, when the clerk 320 has performed a selection operation on the input screen, the cash handling apparatus 100 may automatically input information such as denominations, quantities, etc., that the clerk 320 can designate, based on information obtained from the selected content. Alternatively, the cash handling apparatus 100 may limit denominations, quantities, etc., that the clerk 320 can designate, based on information obtained from the selected content.

Figure 12A:
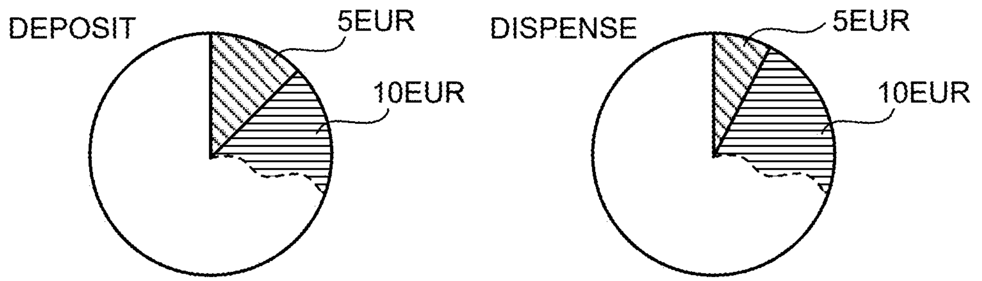
FIGS. 12A and 12B show examples of other store information displayed when the clerk uses the cash handling apparatus.
Figure 12B:
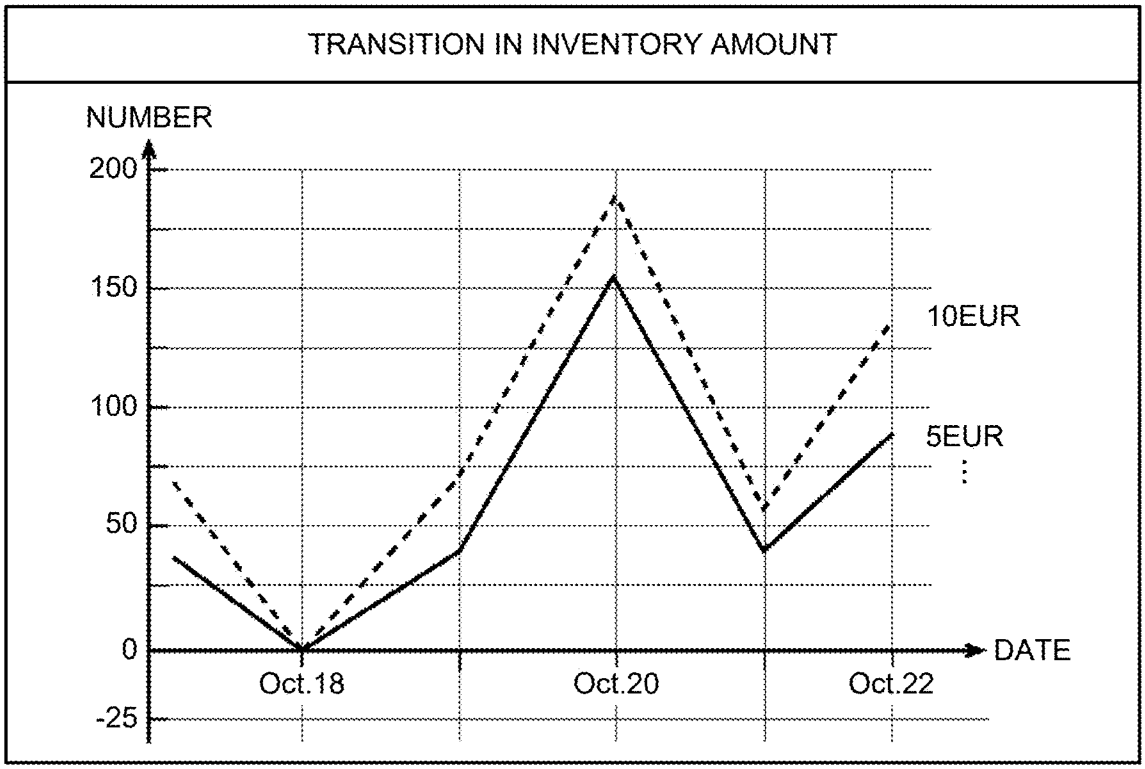

Other store information may be additionally displayed on the screens shown in FIG. 8 and FIG. 11 of the cash handling apparatus 100. FIGS. 12A and 12B show examples of other store information displayed when the clerk 310, 320 uses the cash handling apparatus 100. As shown in FIG. 12A, the cash handling apparatus 100 can display store information indicating the breakdown of cash. In the example shown in FIG. 12A, for each of denominations of cash in the store P, Q, to which the clerk 310, 320 having started to use the cash handling apparatus 100 belongs, denominations and the quantity for each denomination of deposited cash, denominations and the quantity for each denomination of dispensed cash, the ratio of the quantity of deposited cash to the quantity of dispensed cash, and a bar graph indicating the ratio, are displayed. In addition, a pie chart indicating proportions by denomination of the deposited cash and a pie chart indicating proportions by denomination of the dispensed cash, are displayed. For example, based on information acquired by the store support server 10 from each of the stores P, Q during a period from when the store opens for the day's business to when the clerk 310, 320 starts cash handling using the cash handling apparatus 100, the quantities of deposited cash and dispensed cash for each denomination are accumulated to display the screen shown in FIG. 12A. The clerk 310, 320 can change, through setting, the accumulation period, the denomination to be accumulated, the cash handling apparatus to be included in accumulation targets, and the like.

As shown in FIG. 12B, the cash handling apparatus 100 can display store information indicating transition in the quantity of cash. In the broken-line frame shown in FIG. 8 or on the screen shown in FIG. 11, information shown in FIG. 12B is displayed instead of or in addition to the information shown in FIG. 12A. In the example shown in FIG. 12B, line graphs indicating transition in the quantity of cash in the store P, Q, to which the clerk 310, 320 having started to use the cash handling apparatus 100 belongs, are displayed for each denomination. For example, the screen shown in FIG. 12B is displayed based on information acquired by the store support server 10 from the store P, Q over the past several days from the date on which the clerk 310, 320 started cash handling using the cash handling apparatus 100. The clerk 310, 320 can change, through setting, the display period, the denominations to be displayed, the cash handling apparatuses to be included in the display targets, and the like.

Figure 13:
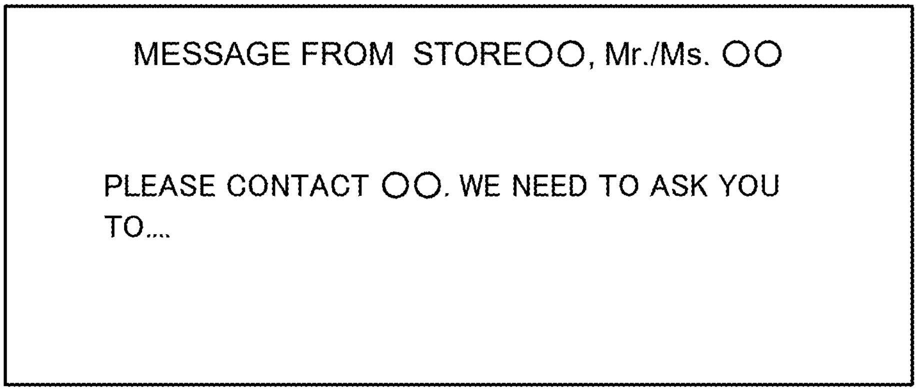
FIG. 13 shows another example of other store information displayed when the clerk uses the cash handling apparatus.

FIG. 13 shows still another example of other store information displayed when the clerk 320 of the other store Q uses the cash handling apparatus 100. The information shown in FIG. 13 is displayed in the broken-line frame shown in FIG. 8 or on the screen shown in FIG. 11. The clerk 320 of the other store Q can display a message on the screen of the cash handling apparatus 100 of the store P by operating the cash handling apparatus 200 or the communication terminal 50. For example, if another clerk of the other store Q wants to send a message to the clerk 320 after the clerk 320 has left the other store Q, the other clerk logs in the cash handling system by operating the cash handling apparatus 200 or the communication terminal 50 and enters the message to register the message in the store support server 10. When the clerk 320 has started cash handling using the cash handling apparatus 100 of the store P, the cash handling apparatus 100 checks whether a message is registered in the store support server 10. When there is a registered message, the cash handling apparatus 100 displays, on the screen, information indicating the clerk who registered the message and the content of the message registered by the clerk to notify the clerk 320 of the message, as shown in FIG. 13. The content of the notification may be only either the information indicating the clerk or the content of the message. The notification may be reproduced by voice instead of or in addition to the screen display. For example, after the clerk 320 has gone to the store P in order to dispense change funds for the store Q, if the other clerk of the store Q wants to have additional cash to be dispensed, the other clerk can transmit a message to the clerk 320 and ask the clerk 320 to dispense the additional cash.

Figure 14:
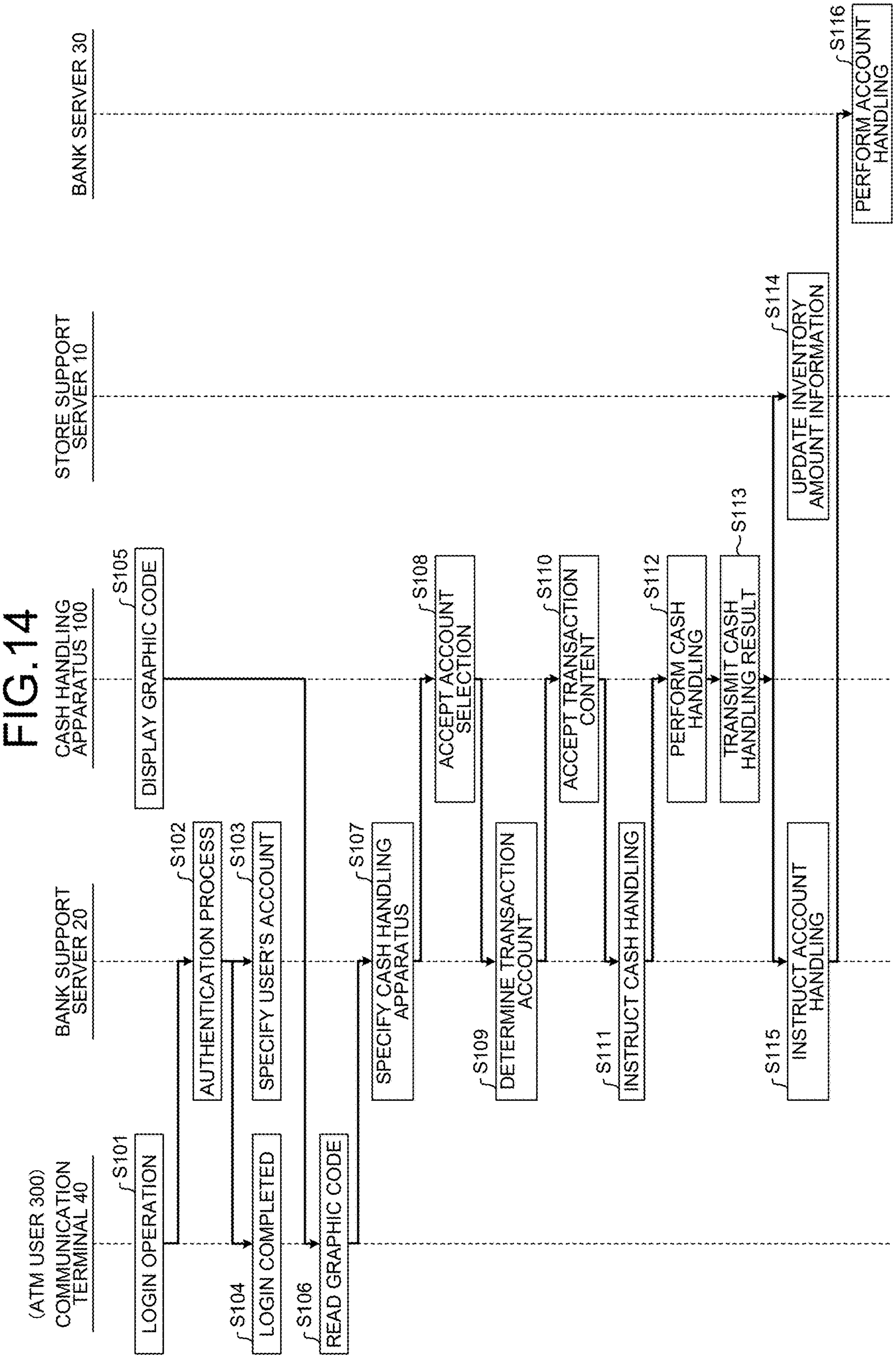
FIG. 14 is a flowchart showing a flow of handling when a customer who wants to use an ATM uses the cash handling apparatus.

Next, the flow of handling performed by the apparatuses in the cash handling system in cooperation with each other will be described with reference to FIG. 14 to FIG. 18. FIG. 14 is a flowchart showing the flow of handling in which the customer 300 who wants to use an ATM uses the cash handling apparatus 100. The customer 300 performs a login operation with the communication terminal 40 such as his/her own smartphone (step S101). An authentication process at the time of login is performed by the bank support server 20 communicably connected to the communication terminal 40 (step S102). Based on a result of the authentication process, the bank support server 20 refers to information on the customer 300 registered therein in advance and specifies account information including the bank account of the customer 300 (step S103). After the user has been authenticated by the bank support server 20 and completed the login process (step S104), the customer 300 is allowed to use the cash handling apparatus 100. Since the login process can be performed by using the communication terminal 40, the customer 300 can perform the login process in advance and then visit the store P to use the cash handling apparatus 100.

The cash handling apparatus 100 can display, on the display 120, a graphic code such as a barcode or a QR code (registered trademark) in which information for the bank support server 20 to specify the cash handling apparatus 100 is encoded (step S105). For example, the customer 300 reads the graphic code displayed on the display 120 of the cash handling apparatus 100 by using a camera of the communication terminal 40 communicably connected to the bank support server 20 (step S106). Based on the graphic code read by the communication terminal 40, the bank support server 20 can specify the cash handling apparatus 100 that the customer 300 is about to use (step S107). This allows the bank support server 20 to control the cash handling apparatus 100 used by the customer 300, as shown in FIG. 5B.

The bank support server 20 displays a screen for the customer 300 to select a bank account, on the display 120 of the cash handling apparatus 100 that the customer 300 has started to use, and accepts selection of a bank account (step S108). For example, the cash handling apparatus 100 displays the screen shown in FIG. 7A on the display 120. When the customer 300 has selected a bank account displayed on the screen of the display 120, the bank support server 20 specifies a transaction account, i.e., the bank account of the customer 300 that is a deposit destination or a withdrawal source of cash to be deposited/dispensed through cash handling (step S109).

The bank support server 20 accepts, at the cash handling apparatus 100, the transaction content of cash handling that the customer 300 desires (step S110). For example, on the screen shown in FIG. 7A, the transaction content such as cash withdrawal or cash depositing is selected simultaneously with the selection of the bank account. For example, the screen of the display 120 of the cash handling apparatus 100 transitions from the screen shown in FIG. 7A to the screen shown in FIG. 7C, and on this screen, the customer 300 selects the transaction content such as cash withdrawal or cash depositing. When the customer 300 has selected cash withdrawal, the cash handling apparatus 100 displays the screen shown in FIG. 7B on the display 120, and the customer 300 inputs the amount to be withdrawn from the bank account.

Based on the transaction content thus determined, the bank support server 20 instructs the cash handling apparatus 100 to perform the cash handling (step S111). The cash handling apparatus 100 performs the cash handling based on the instruction from the bank support server 20 (step S112). The cash handling apparatus 100 transmits the result of the cash handling to the store support server 10 and the bank support server 20 (step S113).

The store support server 10 updates the inventory amount information of the cash handling apparatus 100, based on the information received from the cash handling apparatus 100 (step S114). The update of the inventory amount information of the cash handling apparatus 100 causes the inventory amount information of cash in the store P to be updated as well.

The bank support server 20 instructs the bank server 30 to perform account handling, based on the account information of the customer 300 specified in advance, the transaction content selected by the customer 300, and the information on the cash handling received from the cash handling apparatus 100 (step S115). The bank server 30 performs the account handling based on the instruction from the bank support server 20 (step S116).

Figure 15:
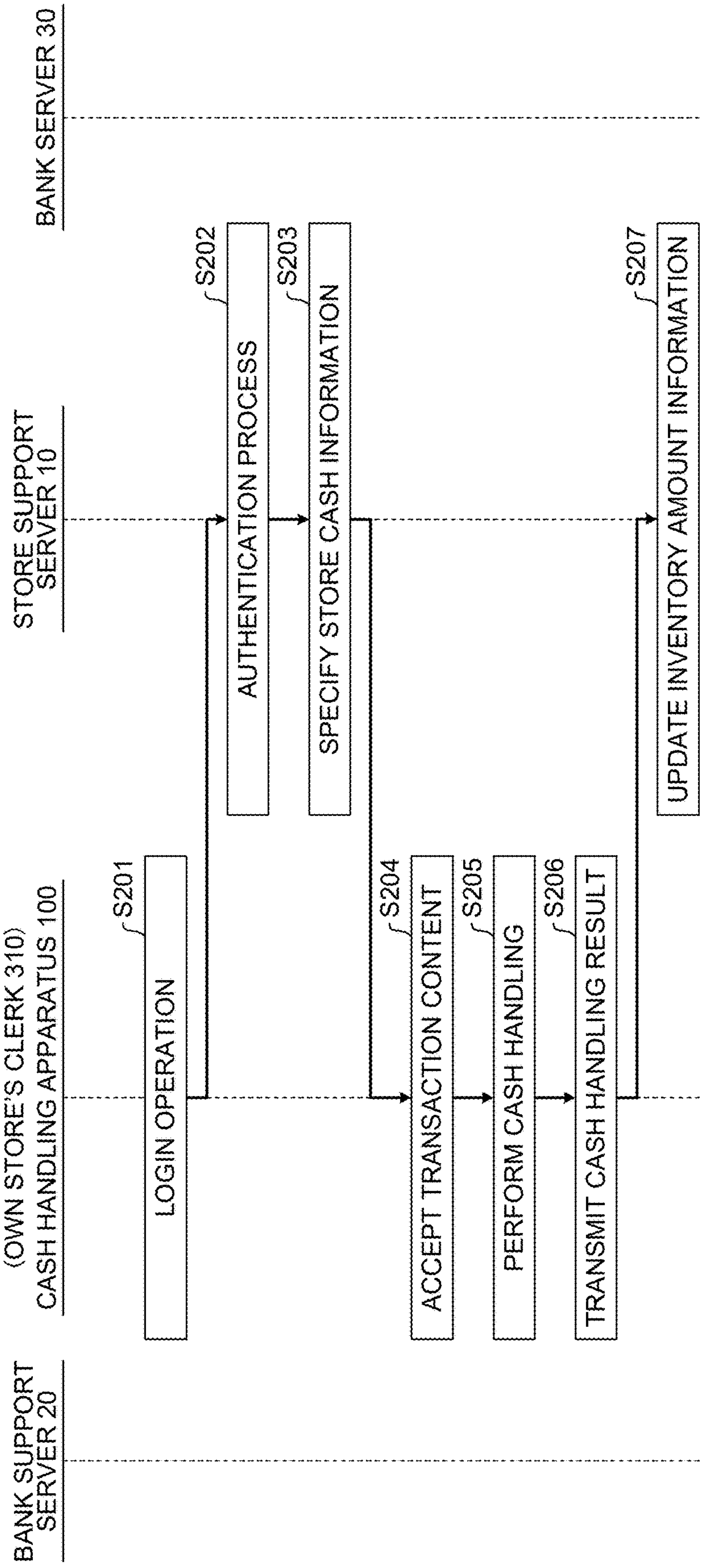
FIG. 15 is a flowchart showing a flow of handling when a clerk of a store where the cash handling apparatus is installed uses the cash handling apparatus.

FIG. 15 is a flowchart showing the flow of handling in which the clerk 310 of the store P where the cash handling apparatus 100 is installed uses the cash handling apparatus 100. When the clerk 310 has performed a login operation by using the operation unit 110 and the display 120 of the cash handling apparatus 100 (step S201), the store support server 10 performs an authentication process (step S202).

Based on the result of the authentication process, the store support server 10 refers to information on the clerk 310 registered in advance, specifies the store P to which the clerk 310 belongs, and specifies information on cash in the store P, such as the inventory amount information managed in the store support server 10 (step S203). This allows the cash handling apparatus 100 to display, on the display 120, the information on the cash in the store P as the store information, as described with reference to FIG. 8 to FIG. 12.

When the information on the cash in the store P, including the inventory amount information, is managed by the cash handling apparatus 100, the cash handling apparatus 100 may display the cash information managed therein. When the cash information of the store P is managed by another apparatus communicably connected to the cash handling apparatus 100, such as a store server installed in the store P, the cash handling apparatus 100 may acquire the cash information from this apparatus and displays the same.

The cash handling apparatus 100 accepts selection of the transaction content which is performed by the clerk 310 by operating the operation unit 110 while checking the information displayed on the display 120 (step S204). The cash handling apparatus 100 performs cash handling based on the instruction by the clerk 310 (step S205). The cash handling apparatus 100 transmits the result of the cash handling to the store support server 10 (step S206). The store support server 10 updates the inventory amount information of the cash handling apparatus 100, based on the information received from the cash handling apparatus 100 (step S207). When the clerk 310 of the store P performs cash handling using the cash handling apparatus 100 of the store P to deposit/dispense cash, account handling is not necessary and therefore, processes by the bank support server 20 and the bank server 30 are not performed.

Figure 16:
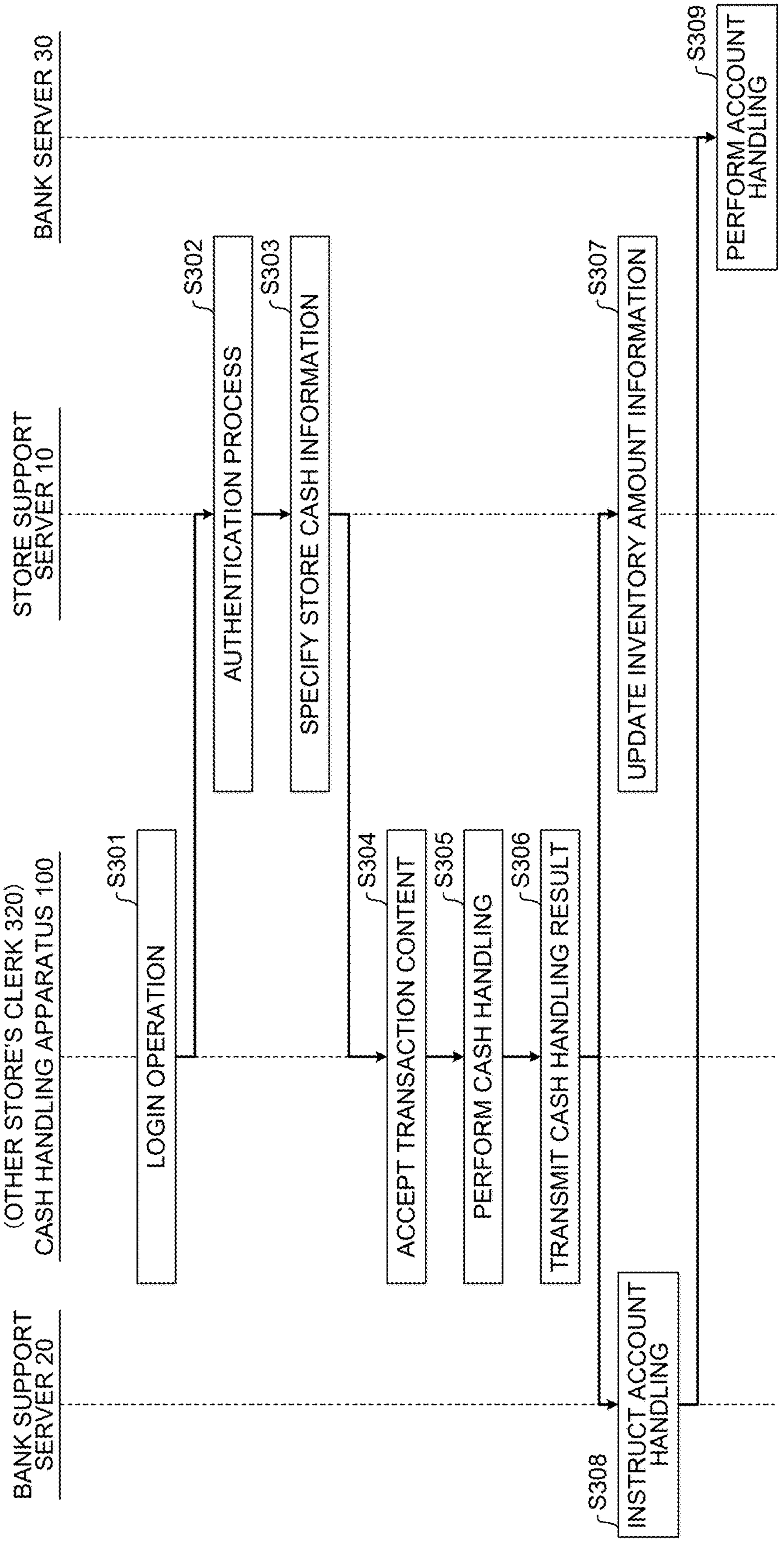
FIG. 16 is a flowchart showing a flow of handling when a clerk of another store uses the cash handling apparatus.

FIG. 16 is a flowchart showing the flow of handling in which the clerk 320 of the other store Q uses the cash handling apparatus 100. When the clerk 320 of the other store Q has performed a login operation by using the operation unit 110 and the display 120 of the cash handling apparatus 100 (step S301), the store support server 10 performs an authentication process (step S302).

Based on the result of the authentication process, the store support server 10 refers to information on the clerk 320 registered in advance, specifies the store Q to which the clerk 320 belongs, and specifies information on cash in the store Q such as the inventory amount information managed in the store support server 10 (step S303). This allows the cash handling apparatus 100 to display, on the display 120, the information on the cash in the store Q as the store information, as described with reference to FIG. 8 to FIG. 12.

The cash handling apparatus 100 accepts selection of the transaction content which is performed by the clerk 320 by operating the operation unit 110 while checking the information displayed on the display 120 (step S304). The cash handling apparatus 100 performs cash handling based on the instruction by the clerk 320 (step S305). The cash handling apparatus 100 transmits the result of the cash handling to the store support server 10 and the bank support server 20 (step S306). The store support server 10 updates the inventory amount information of the cash handling apparatus 100, based on the information received from the cash handling apparatus 100 (step S307).

The bank support server 20 instructs the bank server 30 to perform account handling, based on the account information of the store P and the account information of the store Q, which are registered in advance, the transaction content selected by the clerk 320, and the information on the cash handling received from the cash handling apparatus 100 (step S308). The bank server 30 performs the account handling based on the instruction from the bank support server 20 (step S309).

When the clerk 320 has performed a depositing process by using the cash handling apparatus 100, the deposited amount is transmitted from the cash handling apparatus 100 to the bank support server 20, and account handling to transfer the deposited amount from the bank account of the store P to the bank account of the store Q is performed. When the clerk 320 has performed a dispensing process by using the cash handling apparatus 100, the dispensed amount is transmitted from the cash handling apparatus 100 to the bank support server 20, and account handling to transfer the dispensed amount from the bank account of the store Q to the account of the store P is performed.

The cash handling apparatus 100 may transmit the result of cash handling only to the store support server 10 without transmitting the same to the bank support server 20, and the store support server 10 may transmit the information on the account handling to the bank support server 20.

In this case, the store support server 10 may internally manage information on account handling performed between the stores and may instruct the bank support server 20 to perform account handling based on this information. FIG. 17 shows an example of information on account handling internally managed by the store support server 10.

For example, as shown in FIG. 17, the store ID of the store P where the cash handling apparatus 100 is installed, the apparatus ID of the cash handling apparatus 100, the store IDs of one or more other stores that use the cash handling apparatus 100, account handling conditions for the respective other stores, and breakdowns of cash of the respective other stores in the cash handling apparatus 100, are managed in association with each other.

In FIG. 17, under the item “other store breakdown”, a total amount of cash that each of clerks of one or more other stores has deposited/dispensed in each cash handling performed by using the cash handling apparatus 100 of the store P, is registered. When the clerk of the other store has performed a depositing process by using the cash handling apparatus 100, the deposited amount is added to the total amount of this store. When the clerk has performed a dispensing process, the dispensed amount is subtracted from the total amount of this store. This allows the store support server 10 to manage the cash possessed by each of the other stores, from among the cash in the cash handling apparatus 100.

Under the item “account handling condition” shown in FIG. 17, conditions for performing account handling between the bank account of the store P where the cash handling apparatus 100 is installed and the bank account of each of the other stores, are registered. Each of the other stores can register the timing to perform account handling by designating at least one of the date, day of the week, and time. For example, the account handling condition can be set such that account handling for transferring the total amount registered under the “other store breakdown” is performed between the bank account of the store P and the bank account of the other store, at a predetermined time every day.

As for the other store whose total amount registered under the “other store breakdown” has a positive value when performing account handling, the account handling is performed to transfer the total amount from the bank account of the store P to the bank account of the other store. As for the other store whose total amount registered under the “other store breakdown” has a negative value when performing account handling, the account handling is performed to transfer the total amount from the bank account of the other store to the bank account of the store P.

The other store can register the timing to perform account handling by designating a monetary amount. For example, the account handling condition can be set such that account handling for transferring the total amount between the bank account of the store P and the bank account of the other store is performed when the total amount registered under the item “other store breakdown” reaches a predetermined amount, regardless of date and time. For example, in a case where the account handling condition is set such that account handling for transferring the total amount registered under the “other store breakdown” from the bank account of the other store Q to the bank account of the store P is performed when the total amount reaches minus 2000 euros, the account handling is performed at the timing when the total amount reaches minus 2000 euros regardless of date and time.

Figure 18:
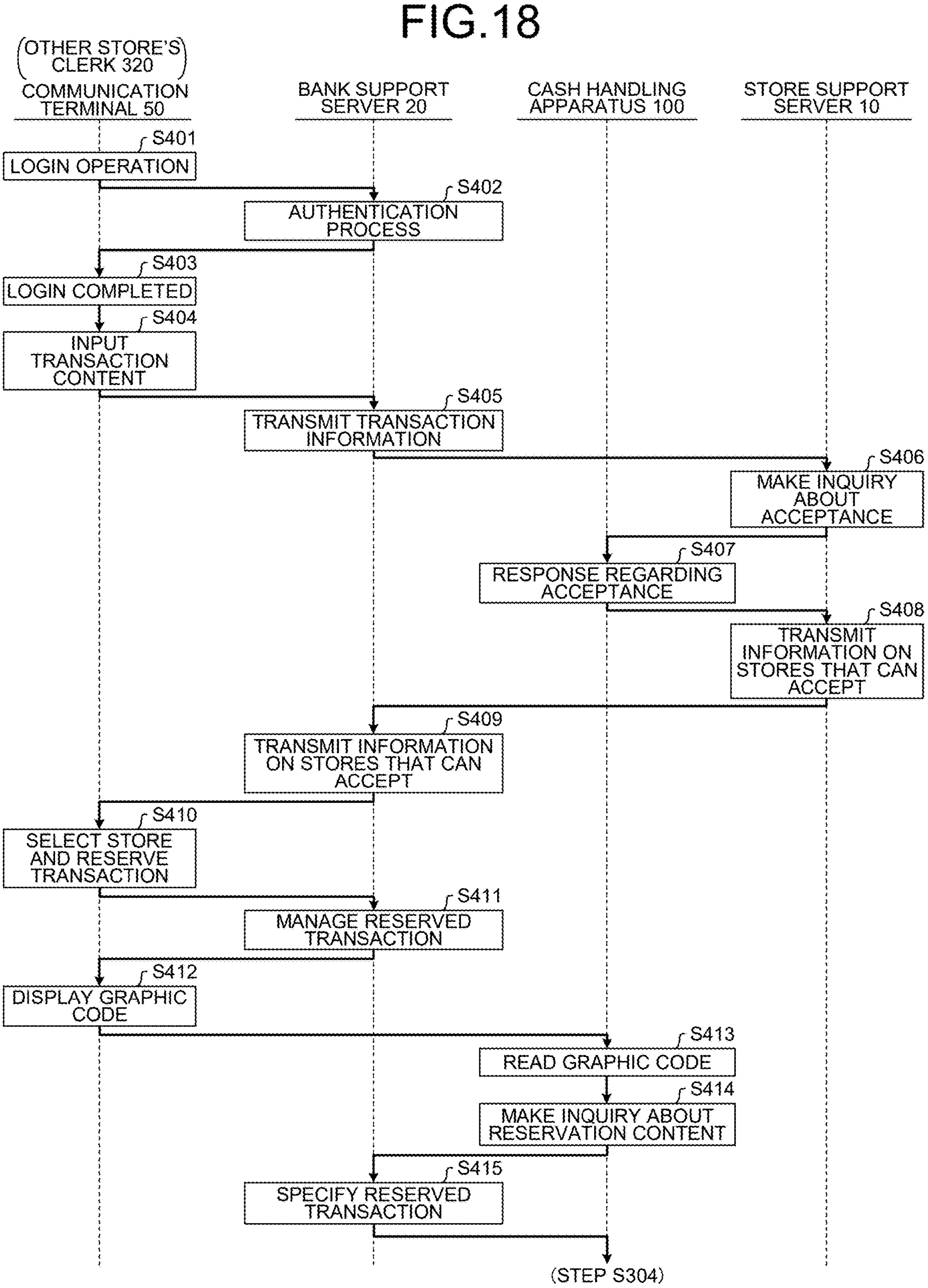
FIG. 18 is a flowchart showing a flow of handling when a clerk of another store reserves cash handling.

When the other store Q deposits sales proceeds from the store Q or dispenses change funds by using the cash handling apparatus 100 of the store P, the amount of cash deposited or dispensed may be large. Therefore, in the cash handling system, the clerk 320 of the other store Q is allowed to reserve cash handling. FIG. 18 is a flowchart showing the flow of handling in which the clerk 320 of the other store Q reserves cash handling. Hereinafter, the description will be continued for an example in which a change fund dispensing process is reserved.

The clerk 320 of the other store Q performs a login operation by operating the communication terminal 50 such as a smartphone (step S401). An authentication process at the time of login is performed by the bank support server 20 communicably connected to the communication terminal 50 (step S402). After being authenticated and logged in to the bank support server 20 (step S403), the clerk 320 operates the communication terminal 50 to input the transaction content to be reserved (step S404).

Figure 19A:
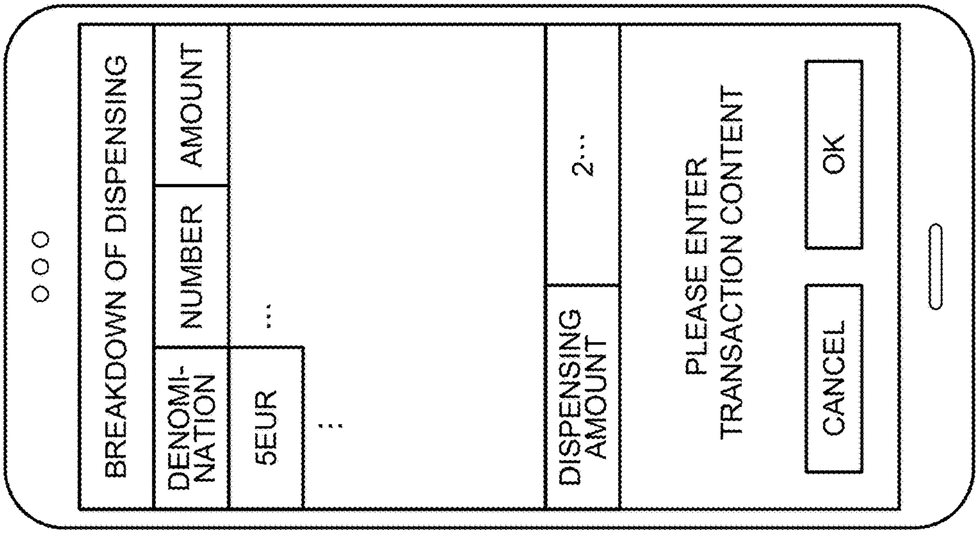
FIGS. 19A, 19B and 19C show examples of screens displayed on a communication terminal when cash handling is reserved.
Figure 19B:
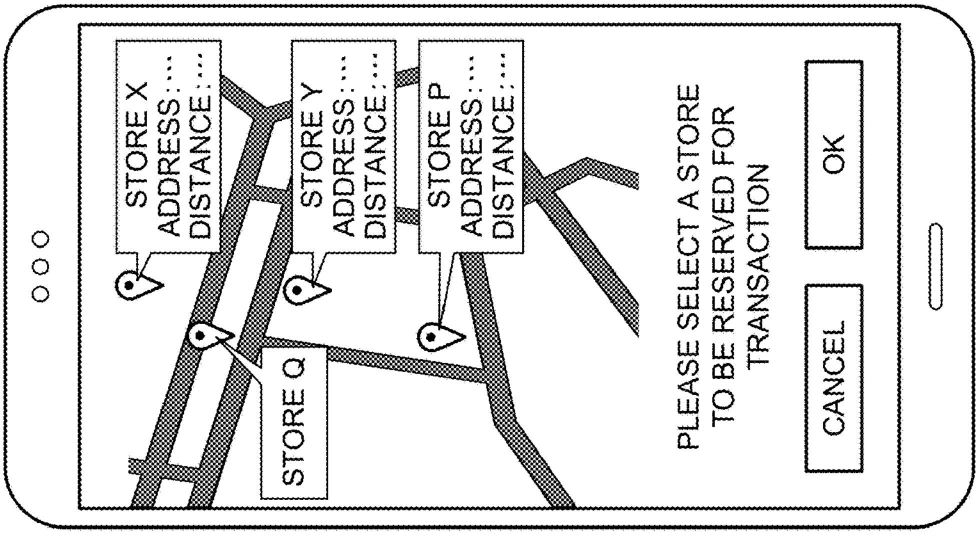
Figure 19C:
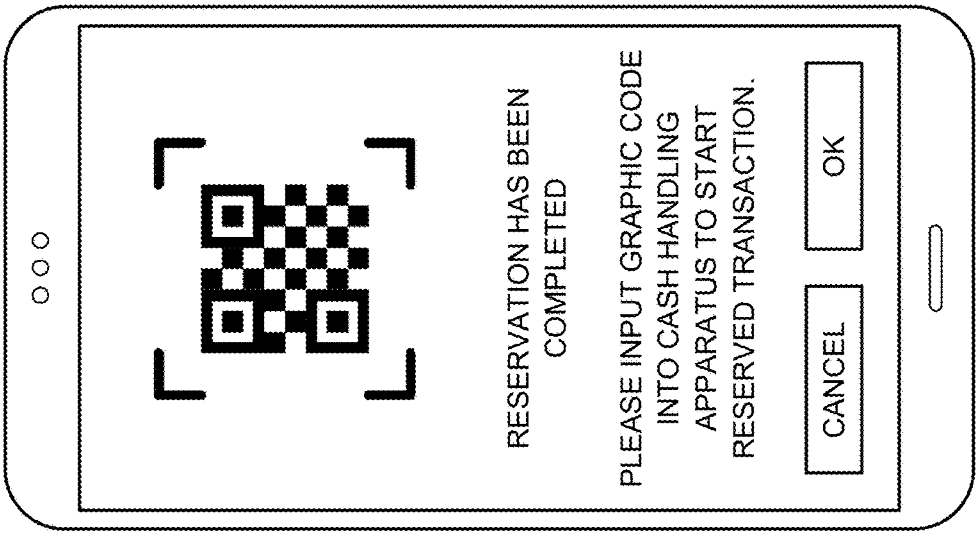

FIGS. 19A, 19B and 19C show examples of screens displayed on the communication terminal 50 during the reservation of cash handling. When the clerk 320 reserves withdrawal of cash from the bank account of the store Q for the dispensing process of the change funds of the store Q, The screen shown in FIG. 19A is displayed on the communication terminal 50. The clerk 320 can input, via the communication terminal 50, a plurality of denominations, and the quantity or amount for each denomination of cash to be dispensed from the cash handling apparatus 100.

The clerk 320 presses an OK button after designating denominations, and the quantity or amount for each denomination of cash to be dispensed, whereby the bank support server 20 transmits, to the store support server 10, transaction information including the designated denominations, and quantity or amount for each denomination (step S405). For example, the transaction information includes location information indicating the location of the store Q to which the clerk 320 belongs, in addition to the transaction content.

Based on the transaction information received from the bank support server 20, the store support server 10 performs processes for making inquiries to the store P where the cash handling apparatus 100 is installed, and other stores where apparatuses similar to the cash handling apparatus 100 are installed, in order to confirm whether the stores can handle the transaction (step S406). For example, the store support server 10 transmits the transaction content inputted by the clerk 320 to the cash handling apparatuses of the stores located within a predetermined range of distance from the store Q based on the location information of the store Q included in the transaction information, to confirm whether the transaction content can be handled at each store.

The cash handling apparatuses 100 having received the transaction information from the store support server 10 determines, based on denominations, and the quantity for each denomination of cash therein, whether the transaction content can be handled by the cash handling apparatus 100. Then, the cash handling apparatus 100 responds to the inquiry from the store support server 10 (step S407). Each of the other cash handling apparatuses having received the inquiry also makes similar determination and responds to the store support server 10 whether the apparatus can handle the transaction.

Based on the responses received from one or more cash handling apparatuses, the store support server 10 transmits, to the bank support server 20, information on the stores where the cash handling apparatuses capable of handling the transaction designated by the clerk 320 are located (step S408).

The bank support server 20 transmits store information received from the store support server 10, to the communication terminal 50 of the clerk 320 (step S409). As shown in FIG. 19B, a list of information on the stores capable of handling the transaction content designated by the clerk 320 is displayed on the screen of the communication terminal 50. The distance from the store Q, where the clerk 320 is present, to each store, and a map of an area around each store may be displayed on the screen. The clerk 320 checks the information on the screen and selects a store to perform the cash handling (step S410). For example, the clerk 320 selects a store closest to the store Q. If there is no cash handling apparatus capable of handling the transaction content designated by the clerk 320, information indicating this fact is displayed on the communication terminal 50, and the clerk 320 changes the transaction content or the like. Hereinafter, the description will be continued assuming that the cash handling apparatus 100 of the store P can handle the transaction designated by the clerk 320, and the clerk 320 selects the store P.

When the clerk 320 has selected the store to perform cash handling and presses the OK button on the screen shown in FIG. 19B, a reservation for the cash handling is made, and the bank support server 20 stores therein the content of the reserved transaction and starts managing the reserved transaction content (step S411). After completing the reservation for the cash handling, a graphic code generated by encoding information for specifying the reservation content can be displayed on the screen of the communication terminal 50 as shown in FIG. 19C (step S412).

The clerk 320 moves to the selected store P and causes the acquisition unit 170 of the cash handling apparatus 100 to read the graphic code displayed on the screen of the communication terminal 50 (step S413). The cash handling apparatus 100 recognizes that the reserved transaction content needs to be performed by the apparatus. The cash handling apparatus 100 transmits the graphic code or information included in the graphic code to the bank support server 20 and makes an inquiry about the reserved transaction content (step S414). Based on the information received from the cash handling apparatus 100, the bank support server 20 specifies the reserved transaction content (step S415). The specified transaction content is transmitted from the bank support server 20 to the cash handling apparatus 100, and the cash handling apparatus 100 becomes ready to perform cash handling for the received transaction content. Thereafter, the handling is continued in the same manner as that from step S304 in FIG. 16.

The clerk 320 simply causes the cash handling apparatus 100 to read the graphic code displayed on the communication terminal 50 as shown in FIG. 19C, whereby the cash handling apparatus 100 becomes able to perform a dispensing process of dispensing cash in the denominations and the quantity or amount for each denomination, which are designated by the clerk 320 at the time of reservation. The clerk 320 can immediately perform the reserved dispensing process by using the cash handling apparatus 100 without operations for inputting the denominations and the quantity for each denomination via the operation unit 110 of the cash handling apparatus 100. The cash handling apparatus 100 dispenses cash based on the denominations and the quantity or amount for each denomination designated when the clerk 320 made the reservation. The clerk 320 can take the cash dispensed from the cash handling apparatus 100 back to the store Q and use the cash as change funds.

In the same way as the reservation of the dispensing process, the clerk 320 can also reserve a depositing process. For example, when the clerk 320 reserves a depositing process for sales proceeds from the store Q, the clerk 320 selects a depositing process and inputs the amount of the sales proceeds to be deposited, by using the communication terminal 50. In the same way as in the case of the dispensing process, stores having cash handling apparatuses, into which the sales proceeds can be deposited, are searched for, and a list of the stores is displayed on the screen of the communication terminal 50.

For example, when the clerk 320 has selected the store P and reserved a depositing process, a graphic code is displayed on the screen of the communication terminal 50. The clerk 320 moves to the store P and causes the cash handling apparatus 100 to read the graphic code, whereby the depositing process is started. After starting the depositing process, the amount of the sales proceeds inputted when the clerk 320 made the reservation is displayed on the display 120 of the cash handling apparatus 100. The cash handling apparatus 100 performs the depositing process, and displays a deposited amount, which is obtained by recognizing and counting the sales proceeds actually deposited by the clerk 320, on the display 120. With the display 120 of the cash handling apparatus 100, the clerk 320 can confirm that the reserved deposited amount matches the deposited amount actually deposited into the cash handling apparatus 100. A button for selecting whether to continue or cancel the depositing process is displayed on the screen of the cash handling apparatus 100. The clerk 320 having confirmed that the deposited amounts match can select to continue the depositing process and complete the depositing process. If the deposited amounts do not match, the clerk 320 can select to cancel the depositing process and cause the cash handling apparatus 100 to discharge the cash deposited as the sales proceeds, in order to investigate the cause of the mismatch.

When the customer 300 who will withdraw cash from a bank account logs in, the cash handling apparatus 100 of the present embodiment displays an input screen for designating a withdrawal amount. The cash handling apparatus 100 performs a dispensing process for dispensing cash based only on the amount designated by the customer 300 on the input screen. The cash handling apparatus 100 determines denominations, and the quantity of each denomination of cash based on the designated amount and dispenses the determined cash. That is, the cash handling apparatus 100 does not accept operation by the customer 300 for designating denominations, and the quantity for each denomination of cash to be dispensed. Meanwhile, when the clerk logs in, the cash handling apparatus 100 displays an input screen for designating the quantity for each denomination to instruct a dispensing process and performs the dispensing process for dispensing cash in the designated quantity for each denomination. In the cash handling apparatus 100, when the clerk logs in, the clerk can designate more detailed dispensing content such as breakdown for each denomination, compared to the case where the customer logs in. When the clerk logs in, the cash handling apparatus 100 may change the store information displayed on the input screen, according to the cash handling menu selected by the clerk. For example, when a dispensing process is selected by the clerk, the cash handling apparatus 100 may narrow down the information to be displayed on the screen to the information necessary for performing the dispensing process. For example, based on the inventory amount information of the store to which the clerk belongs, the cash handling apparatus 100 may display only information on cash to be dispensed and used for replenishing the apparatus of that store, or only information of the apparatus of that store which needs to be replenished with cash. The cash handling apparatus 100 may limit the content that the clerk can designate. For example, based on the inventory amount information of the store to which the clerk belongs, the cash handling apparatus 100 may limit denominations of cash that can be designated by the clerk, to denominations of cash to be used for replenishment, or limit the quantity of cash that can be designated by the clerk, to a quantity not greater than or not less than the quantity required for replenishment.

In the present embodiment, the cash handling apparatuses 100, 200, 201 in the stores P, Q are directly connected to the store support server 10 and the bank support server 20. However, these apparatuses may be connected to the servers 10 and 20 via other devices. For example, a large store may have a store server for managing a plurality of cash handling apparatuses installed in the store. In this case, the cash handling apparatuses in the store may communicate with the store support server 10 and the bank support server 20 via the store server. Some of the functions and operations of the cash handling apparatuses 100, 200, 201 may be realized by the store server.

In the present embodiment, the cash handling apparatus 100, the store support server 10, and the bank support server 20 execute the respective corresponding applications. However, this is merely an example and does not limit the application execution method. For example, the application executed by the cash handling apparatus 100 in the above examples may be executed by another device such as the store support server 10 or the bank support server 20, and the cash handling apparatus 100 may operate in response to an instruction from the other device. Likewise, the application executed by the store support server 10 in the above examples may be executed by another device such as the cash handling apparatus 100 or the bank support server 20, and the store support server 10 may operate in response to an instruction from the other device. Moreover, the application executed by the bank support server 20 in the above examples may be executed by another device such as the cash handling apparatus 100 or the store support server 10, and the bank support server 20 may operate in response to an instruction from the other device.

In the present embodiment, information on cash handling performed by the cash handling apparatus 100 is transmitted to the store support server 10 or the bank support server 20. However, this is merely an example and does not limit the method for the cash handling information. For example, the cash handling apparatus 100 may store therein both information on cash handling for a bank account performed by the customer 300 and information on cash handling for cash in a store performed by the clerk 310, 320 so as to be distinguishable from each other. That is, in the cash handling system, all log information on cash handling performed by the cash handling apparatus 100 may be stored and managed in the cash handling apparatus 100, separately for cash handling performed by the customer 300, cash handling performed by the clerk 310 of the own store, and cash handling performed by the clerk 320 of the other store. The log information may include information indicating the date and time when cash handling was performed, information indicating the login user who performed the cash handling, and information indicating denominations, the quantity for each denomination, and the total amount of cash that was deposited/dispensed. The log information may be managed by the store server connected to the cash handling apparatus 100 instead of or in addition to the cash handling apparatus 100 or may be managed by the store support server 10.

In the present embodiment, the store support server 10, the bank support server 20, and the bank server 30 are independently provided. However, the store support server 10 may also function as the bank support server 20.

A cash handling system according to one aspect of the present disclosure includes: a cash handling apparatus; a support server configured to store therein store identification information of a plurality of stores, inventory amount information of cash in each store, and ID information of each of clerks of the stores; an acquisition unit configured to acquire ID information from a user of the cash handling apparatus; and a control circuitry configured to, in a case where the user authenticated based on the ID information acquired by the acquisition unit is a clerk, acquire inventory amount information of the store stored in the support server in association with the ID information, and display, on a display of the cash handling apparatus, an input screen which includes the acquired inventory amount information and is used for instructing cash handling to be performed by the cash handling apparatus, wherein the cash handling apparatus performs the cash handling, based on an instruction from the user performed on the input screen.

In the above configuration, the cash handling apparatus may display, on the input screen, a user interface for the clerk to designate a type and a quantity of cash to be dispensed, and displays, in a partial area on the input screen, inventory amount information of the store to which the clerk belongs.

In the above configuration, the inventory amount information displayed on the input screen may include a graphic display related to an inventory amount of the store.

In the above configuration, the graphic display may include at least one of: a display indicating a proportion of each type of cash in the store; and a display indicating a transition in the inventory amount of the cash in the store.

In the above configuration, the support server may accept a reservation for a dispensing process by receiving denominations, and a quantity or an amount for each denomination of cash, which are inputted by the clerk by operating a communication terminal communicably connected to the support server for the reservation. In a case where the clerk who has reserved the dispensing process uses the cash handling apparatus, the cash handling apparatus may display an input screen for the dispensing process, and display the denominations, and the quantity or the amount for each denomination of the cash, which have been inputted by the clerk at the reservation for the dispensing process, on the input screen.

In the above configuration, the cash handling apparatus may dispense cash, without acquiring designation of content of the dispensing process from the clerk, based on the denominations, and the quantity or the amount for each denomination of the cash, which have been inputted by the clerk at the reservation for the dispensing process.

In the above configuration, in a case where the clerk, who has inputted a deposit amount by operating a communication terminal communicably connected to the support server to reserve a depositing process, uses the cash handling apparatus, the cash handling apparatus may display an input screen for the depositing process, and display the deposit amount which has been inputted by the clerk at the reservation for the depositing process, on the input screen.

In the above configuration, the cash handling apparatus may display the input screen including: a deposited amount obtained by recognizing and counting the cash deposited by the clerk; and the deposit amount of the depositing process that has been reserved by the clerk.

In the above configuration, the support server may accept a message transmitted from a terminal in the store, and store therein the message in association with the store identification information to which the clerk belongs. The cash handling apparatus may receive the message from the support server and notifies the clerk of the message, based on the ID information acquired by the acquisition unit.

In the above configuration, the cash handling system may further include a store server configured to store therein inventory amount information of cash in a store where the cash handling apparatus is installed, in addition to the support server that stores therein the inventory amount information of the plurality of stores. In a case where the ID information of the clerk acquired by the acquisition unit is ID information of the clerk of the own store where the cash handling apparatus is installed, the cash handling apparatus may acquire the inventory amount information of the own store from the store server. In a case where the ID information is not ID information of the clerk of the own store, the cash handling apparatus may acquire the inventory amount information of the store to which the clerk belongs from the support server.

In the above configuration, the cash handling system may further include a bank support server configured to support ATM-related operations performed by the cash handling apparatus, in addition to the support server. In a case where the user is a clerk, the cash handling apparatus may perform the cash handling in cooperation with the support server. In a case where the user is a customer of the store, the cash handling apparatus may perform the cash handling in cooperation with the bank support server. In this case, the bank support server may transmit an amount of cash deposited or dispensed by using the cash handling apparatus to a bank server capable of performing account handling related to a bank account of the customer, and the balance of the bank account may be updated through the account handling.

In the above configuration, in a case where the user is the clerk, the control circuitry may change display content of the inventory amount information displayed on the display, based on handling selected by the user as handling to be performed by the cash handling apparatus.

In the above configuration, based on the acquired inventory amount information, the control circuitry may limit a type and a quantity, which can be designated by the user on an input screen for a dispensing process, of cash to be dispensed in the dispensing process In the above configuration, the control circuitry may accept an operation for selecting a part of the inventory amount information displayed on the input screen, and automatically input a denomination and/or a quantity, which can be designated on the input screen, based on information obtained from the inventory amount information selected by the user.

A cash handling method according to one aspect of the present disclosure is a method performed by a cash handling system including a cash handling apparatus. The method includes: acquiring ID information of a user from the user requesting the cash handling apparatus to perform cash handling; determining whether the user is a customer of a store, a clerk of a store where the cash handling apparatus is installed, or a clerk of another store; and in a case where the user is determined to be a clerk, acquiring, from a server storing identification information of a plurality of stores and inventory amount information of cash in each store, inventory amount information of the store corresponding to the clerk, and displaying an input screen including the acquired inventory amount information, for instructing cash handling to be performed in the cash handling apparatus.

According to the cash handling system and the cash handling method of the present disclosure, it is possible to provide a cash handling apparatus that is highly convenient for a store clerk who prepares change funds and deposits sales proceeds related to store operations.

The components of the cash handling system according to the present embodiment are conceptually functional components, and thus may not necessarily be physically limited thereto. For example, the store support server 10 may realize a part of the functions and operations of the bank support server 20 described above. The bank support server 20 may realize a part of the functions and operations of the store support server 10 described above. The bank support server 20 may realize a part of the functions and operations of the bank server 30 described above. The distributed or integrated forms of each device are not limited to the above-described example, and all or some of the forms may be distributed or integrated functionally or physically in any unit depending on various loads, use statuses, or the like.

As described above, in the cash handling system, a plurality of types of users including the clerk of the store where the cash handling apparatus is installed, the customer at the store, and the clerk of another store can perform cash handling by using the cash handling apparatus. The customer can perform dispensing of cash withdrawn from a bank account and depositing of cash into a bank account by using, like an ATM, the cash handling apparatus provided for handling cash for the store. The clerk of the other store can perform dispensing of change funds and depositing of sales proceeds by using the cash handling apparatus. The cash handling apparatus can change the user interface and the content of handling, according to the type of the user. The cash handling apparatus performing handling according to the type of the user improves convenience for a variety of users.

What is claimed is:

1. A cash handling system, comprising:

a cash handling apparatus;

a store support server configured to store therein store identification information of a plurality of stores, inventory amount information of cash in each store, and ID information of each of clerks of the stores;

a bank support server configured to support ATM-related operations performed by the cash handling apparatus;

an acquisition device configured to acquire ID information from a user of the cash handling apparatus; and a control circuitry configured to, in a case where the user authenticated based on the ID information acquired by the acquisition device is a clerk, acquire inventory amount information of a store of the plurality of stores stored in the store support server in association with the ID information, and display, on a display of the cash handling apparatus, an input screen which includes the acquired inventory amount information and is used for instructing cash handling to be performed by the cash handling apparatus, wherein the cash handling apparatus performs the cash handling, based on an instruction from the user performed on the input screen, in a case where the user is a clerk, the cash handling apparatus performs the cash handling in cooperation with the store support server, and in a case where the user is a customer of the store, the cash handling apparatus performs the cash handling in cooperation with the bank support server, the bank support server transmits an amount of cash deposited or dispensed by using the cash handling apparatus to a bank server capable of performing account handling related to a bank account of the customer, and the balance of the bank account is updated through the account handling.

2. The cash handling system according to claim 1, wherein the cash handling apparatus displays, on the input screen, a user interface for the clerk to designate a type and a quantity of cash to be dispensed, and displays, in a partial area on the input screen, inventory amount information of the store to which the clerk belongs.

3. The cash handling system according to claim 1, wherein the inventory amount information displayed on the input screen includes a graphic display related to an inventory amount of the store.

4. The cash handling system according to claim 3, wherein the graphic display includes at least one of: a display indicating a proportion of each type of cash in the store; and a display indicating a transition in the inventory amount of the cash in the store.

5. The cash handling system according to claim 1, wherein the store support server accepts a reservation for a dispensing process by receiving denominations, and a quantity or an amount for each denomination of cash, which are inputted by the clerk by operating a communication terminal communicably connected to the store support server for the reservation, and in a case where the clerk who has reserved the dispensing process uses the cash handling apparatus, the cash handling apparatus displays an input screen for the dispensing process, and displays the denominations, and the quantity or the amount for each denomination of the cash, which have been inputted by the clerk at the reservation for the dispensing process, on the input screen.

6. The cash handling system according to claim 5, wherein the cash handling apparatus dispenses cash, without acquiring designation of content of the dispensing process from the clerk, based on the denominations, and the quantity or the amount for each denomination of the cash, which have been inputted by the clerk at the reservation for the dispensing process.

7. The cash handling system according to claim 1, wherein in a case where the clerk, who has inputted a deposit amount by operating a communication terminal communicably connected to the store support server to reserve a depositing process, uses the cash handling apparatus, the cash handling apparatus displays an input screen for the depositing process, and displays the deposit amount which has been inputted by the clerk at the reservation for the depositing process, on the input screen.

8. The cash handling system according to claim 7, wherein the cash handling apparatus displays the input screen including: a deposited amount obtained by recognizing and counting the cash deposited by the clerk; and the deposit amount of the depositing process that has been reserved by the clerk.

9. The cash handling system according to claim 1, wherein the store support server accepts a message transmitted from a terminal in the store, and stores therein the message in association with the store identification information to which the clerk belongs, and the cash handling apparatus receives the message from the store support server and notifies the clerk of the message, based on the ID information acquired by the acquisition device.

10. The cash handling system according to claim 1, further comprising a store server configured to store therein inventory amount information of cash in a store where the cash handling apparatus is installed, in addition to the store support server that stores therein the inventory amount information of the plurality of stores, wherein in a case where the ID information of the clerk acquired by the acquisition device is ID information of the clerk of the own store where the cash handling apparatus is installed, the cash handling apparatus acquires the inventory amount information of the own store from the store server, and in a case where the ID information is not ID information of the clerk of the own store, the cash handling apparatus acquires the inventory amount information of the store to which the clerk belongs from the store support server.

11. The cash handling system according to claim 1, wherein in a case where the user is the clerk, the control circuitry changes display content of the inventory amount information displayed on the display, based on handling selected by the user as handling to be performed by the cash handling apparatus.

12. The cash handling system according to claim 1, wherein based on the acquired inventory amount information, the control circuitry limits a type and a quantity, which can be designated by the user on an input screen for a dispensing process, of cash to be dispensed in the dispensing process.

13. The cash handling system according to claim 1, wherein the control circuitry accepts an operation for selecting a part of the inventory amount information displayed on the input screen, and automatically inputs a denomination and/or a quantity, which can be designated on the input screen, based on information obtained from the inventory amount information selected by the user.

14. A cash handling method performed by a cash handling system including a cash handling apparatus, the cash handling method comprising:

acquiring ID information of a user from the user requesting the cash handling apparatus to perform cash handling;

determining whether the user is a customer of a store, a clerk of a store where the cash handling apparatus is installed, or a clerk of another store;

in a case where the user is determined to be a clerk, acquiring, from a server storing identification information of a plurality of stores and inventory amount information of cash in each store, inventory amount information of the store corresponding to the clerk, and displaying an input screen including the acquired inventory amount information, for instructing cash handling to be performed in the cash handling apparatus; and in a case where the user is determined to be a customer of the store, transmitting data on the cash handling to a bank server capable of performing account handling related to a bank account of the customer based on the data on the cash handling.

15. A cash handling system, comprising:

a cash handling apparatus;

an acquisition device configured to acquire ID information from a user of the cash handling apparatus; and a control circuitry configured to, in a case where the user authenticated based on the ID information acquired by the acquisition device is a clerk, acquire inventory amount information of a store stored in a store support server in association with the ID information, and display, on a display of the cash handling apparatus, an input screen which includes the acquired inventory amount information and is used for instructing cash handling to be performed by the cash handling apparatus, wherein the cash handling apparatus performs the cash handling, based on an instruction from the user performed on the input screen, and in a case where the user authenticated based on the ID information acquired by the acquisition unit is a customer of the store, the cash handling apparatus performs the cash handling in cooperation with a bank support server, the bank support server transmits an amount of cash deposited or dispensed by using the cash handling apparatus to a bank server capable of performing account handling related to a bank account of the customer, and the balance of the bank account is updated through the account handling.

* * * * *